US00RE42609E

(19) United States
(12) Reissued Patent
Kurtz et al.

(10) Patent Number: US RE42,609 E
(45) Date of Reissued Patent: Aug. 16, 2011

(54) SYSTEM AND METHOD FOR REDUCING $NO_x$ EMISSIONS DURING TRANSIENT CONDITIONS IN A DIESEL FUELED VEHICLE WITH EGR

(75) Inventors: Eric Matthew Kurtz, Dearborn, MI (US); John H. Vanderslice, Berkley, MI (US)

(73) Assignee: Ford Global Technologies, LLC, Dearborn, MI (US)

(21) Appl. No.: 12/568,988

(22) Filed: Sep. 29, 2009

Related U.S. Patent Documents

Reissue of:
(64) Patent No.: 6,820,599
Issued: Nov. 23, 2004
Appl. No.: 10/248,634
Filed: Feb. 3, 2003

(51) Int. Cl.
*F02M 45/02* (2006.01)
*F02M 25/07* (2006.01)
*F02M 51/00* (2006.01)

(52) U.S. Cl. ..... 123/492; 123/568.21

(58) Field of Classification Search ..... 123/568.21, 123/568.22, 492
See application file for complete search history.

(56) References Cited

U.S. PATENT DOCUMENTS 4,215,550 A 8/1980 Dinger et al.
5,119,780 A 6/1992 Ariga
5,203,311 A 4/1993 Hitomi et al.
5,261,366 A 11/1993 Regueiro
5,341,300 A 8/1994 Fujimoto
5,440,880 A 8/1995 Ceynow et al.
5,740,786 A * 4/1998 Gartner ..... 123/568.12
5,771,868 A 6/1998 Khair
5,806,308 A 9/1998 Khair et al.

(Continued)

FOREIGN PATENT DOCUMENTS

DE 4007516 9/1991

(Continued)

OTHER PUBLICATIONS

SAE 950214, Timoney et al., "Correlation of Injection Rate Shapes with D.I. Diesel Exhaust Emissions", Feb.-Mar. 1995, Detroit, MI., 11 pages.

(Continued)

*Primary Examiner* — Stephen K Cronin
*Assistant Examiner* — Arnold Castro
(74) *Attorney, Agent, or Firm* — Allan J. Lippa; Alleman Hall McCoy Russell & Tuttle LLP

(57) ABSTRACT

The present invention is a dual-stage fuel injection strategy for compression ignition engines in which 15-40% of the fuel is injected into the combustion chamber no later than about −20 to −30 CA ATDC and as early as IVC. The remaining fuel is then injected in one or more fuel pulses, none of which start before about −20 to −30 CA ATDC. The fuel injected early in the compression stroke forms a lean mixture that burns with low soot and low NOx emissions. The combustion of that fuel serves to increase in-cylinder temperature such that the ignition delay of subsequent fuel injection pulses is short. This mode is utilized when it is predicted that a NOx spike is imminent. Various other alternative methods for reducing NOx spikes are also disclosed such as specialized EGR systems that can provide EGR with low manifold vacuum.

35 Claims, 19 Drawing Sheets

U.S. PATENT DOCUMENTS

| | | | | |
|---|---|---|---|---|
| 5,927,075 | A | 7/1999 | Khair | |
| 5,979,398 | A | 11/1999 | Yanagihara | |
| 6,062,026 | A | 5/2000 | Woollenweber et al. | |
| 6,082,325 | A | 7/2000 | Digeser et al. | |
| 6,205,785 | B1 | 3/2001 | Coleman | |
| 6,240,721 | B1 | 6/2001 | Ito et al. | |
| 6,276,334 | B1 | 8/2001 | Flynn et al. | |
| 6,301,887 | B1 | 10/2001 | Gorel et al. | |
| 6,301,888 | B1 | 10/2001 | Gray, Jr. | |
| 6,338,245 | B1 | 1/2002 | Shimoda et al. | |
| 6,354,084 | B1 * | 3/2002 | McKinley et al. | 123/568.12 |
| 6,427,436 | B1 | 8/2002 | Allansson et al. | |
| 6,435,166 | B1 | 8/2002 | Sato et al. | |
| 6,470,864 | B2 | 10/2002 | Kim et al. | |
| 6,470,866 | B2 | 10/2002 | Cook | |
| 6,516,787 | B1 | 2/2003 | Dutart et al. | |
| 6,651,432 | B1 | 11/2003 | Gray, Jr. | |
| 6,694,736 | B2 | 2/2004 | Pfluger | |
| 6,748,741 | B2 | 6/2004 | Martin et al. | |
| 6,820,599 | B2 | 11/2004 | Kurtz et al. | |
| 7,273,045 | B2 | 9/2007 | Kurtz et al. | |
| 2001/0017033 | A1 * | 8/2001 | McKinley et al. | 123/568.12 |

FOREIGN PATENT DOCUMENTS

| | | | |
|---|---|---|---|
| DE | 4007516 | A1 | 9/1991 |
| DE | 69130976 | | 7/1999 |
| DE | 10349129 | | 5/2004 |
| JP | 5-71428 | | 3/1993 |
| JP | 11210449 | | 8/1999 |
| JP | 2002276405 | A * | 9/2002 |
| WO | 2004044412 | | 5/2004 |

OTHER PUBLICATIONS

SAE 970873, John E. Dec, "A Conceptual Model of DI Diesel Combustion Based on Laser-Sheet Imaging", Feb. 1997, Detroit, MI., 32 pages.

SAE 980509, Suzuki et al., "Combustion Control Method of Homogeneous Charge Diesel Engines", Feb. 1998, Detroit, MI., 9 pages.

SAE 1999-01-0509, Flynn et al., "Diesel Combustion: An integrated View Combining Laser Diagnostics, Chemical Kinetics, and Empirical Validation", Mar. 1999, Detroit, MI., 16 pages.

* cited by examiner

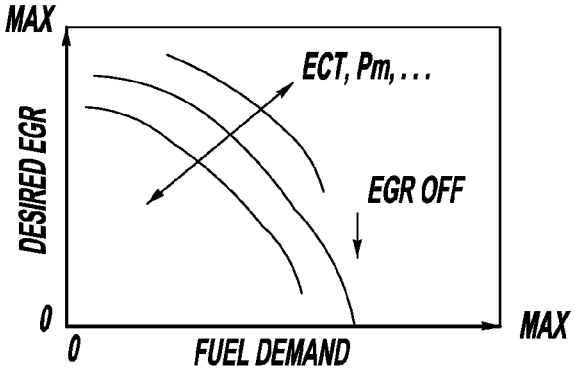
Figure - 4
Figure - 4A
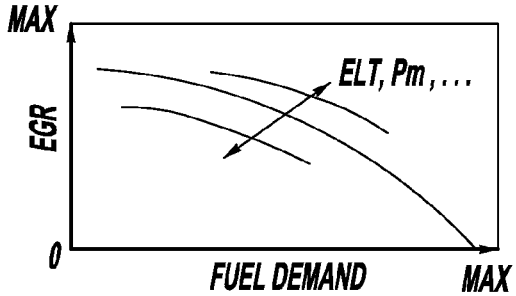
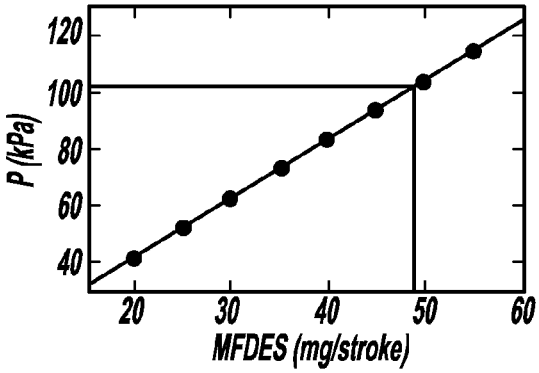
Figure - 6A
Figure - 6B
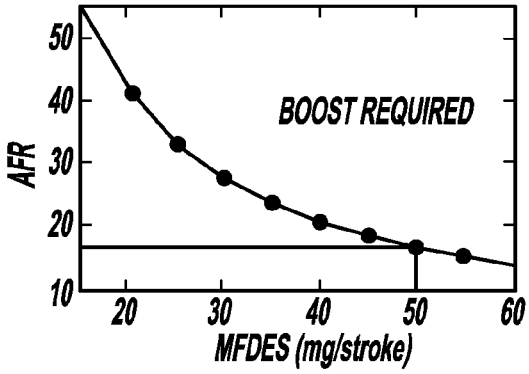

SYSTEM AND METHOD FOR REDUCING $NO_x$ EMISSIONS DURING TRANSIENT CONDITIONS IN A DIESEL FUELED VEHICLE WITH EGR

Matter enclosed in heavy brackets [ ] appears in the original patent but forms no part of this reissue specification; matter printed in italics indicates the additions made by reissue.

CROSS REFERENCE TO RELATED APPLICATIONS

[This application is] *This application is a reissue application of U.S. Pat. No. 6,820,599, issued Nov. 23, 2004, entitled "SYSTEM AND METHOD FOR REDUCING NOx EMISSIONS DURING TRANSIENT CONDITIONS IN A DIESEL FUELED VEHICLE WITH EGR", which is* related to Ser. No. 10/248,633, titled, "SYSTEM AND METHOD FOR REDUCING NOx EMISSIONS DURING TRANSIENT CONDITIONS IN A DIESEL FUELED VEHICLE", *now U.S. Pat. No. 6,863,058,* assigned to the assignee of the present application, and filed on the same day as the present application. The entire contents of [Ser. No. 10/248,633] *these applications* are hereby incorporated by reference into the present application.

BACKGROUND OF INVENTION

1. Field of the Invention

The present invention relates generally to the control of an internal combustion engine powered by diesel fuel, and more specifically to reducing transient NOx generation produced by such a vehicle.

2. Background of the Invention

Controlling NOx emissions in diesel engines has posed significant challenges to the automotive industry. While emission control devices, such as NOx catalysts, can be used, these devices may be insufficient to meet ever-increasing emission standards.

A method to reduce NOx in diesel engines is the use of exhaust gas recirculation (EGR). EGR reduces NOx emissions during steady, or near steady, engine operation.

However, under transient engine operation in which a vehicle is required to accelerate, EGR can limit the performance of the vehicle by reducing the amount of airflow through the engine. EGR reduces airflow by displacing air in the combustion chamber, heating up the intake charge, and redirecting exhaust gas that would normally go through the turbocharger to the intake manifold. This last effect reduces the energy flow through the turbine, thus restricting the engine's ability to create boost. This phenomenon can be dubbed "the EGR-Boost" tradeoff.

Typically, conventional diesel systems suspend the use of EGR in order to accelerate aggressively. However, the inventors herein have recognized that without EGR, NOx emissions (concentration) increase dramatically. This comes at a time when the air mass flow rates are very high, causing NOx production to spike. Thus, the place where EGR is most needed is the place where it is not used.

The difficulty of this problem can be further appreciated by considering two types of EGR system that could be used with turbo-charged engines: the high pressure system and the low pressure system. The inventors herein have recognized the following disadvantages with each system.

In heavy duty applications, high pressure EGR systems have difficulty providing sufficient EGR flow at high load conditions, especially at low speed, since there is a negative pressure differential between the exhaust and intake manifold. One method to improve EGR flow is to throttle the engine. However, throttling the engine increases engine pumping work and decreases the gas flow to the engine.

Similarly, low pressure EGR systems allow only limited amounts of EGR under light load conditions, especially at low speed, since there is little pressure differential. Further, the low pressure EGR system adds significant purging volume that causes delays when trying to accelerate.

SUMMARY OF INVENTION

The above disadvantages are overcome by a system for an engine having an intake and exhaust manifold, the engine having a compression device coupled with a first portion coupled to the intake and a second portion coupled to the exhaust manifold of the engine, the system comprising: a first exhaust gas recirculation system having a first end coupled to the exhaust manifold upstream of the second portion of the compression device and a second end coupled to the intake manifold downstream of the first portion compression device, said first system also having a first valve that adjusts a first flow amount from the exhaust manifold to the intake manifold; a second exhaust gas recirculation system having a first end coupled downstream of the second portion of the compression device and a second end coupled to the intake manifold, said first system also having a second valve that adjusts a second flow amount from the exhaust to the intake manifold.

By providing multiple EGR loops, it is possible to reduce NOx emissions during high engine load, even in the presence of a compression device such as a supercharger. In other words, by using both a two EGR loops, one can obtain the benefits of each of the high pressure and low pressure EGR systems and thereby minimize the disadvantages of each system since the two systems complement each other.

Another advantage of the present invention is the ability to reduce transient NOx spikes.

Yet another advantage of the present invention is the ability of multiple loop EGR systems to enable the use of EGR throughout the entire engine map without using a throttle.

BRIEF DESCRIPTION OF DRAWINGS

The advantages described herein will be more fully understood by reading an example of an embodiment in which the invention is used to advantage, referred to herein as the Description of the Preferred Embodiment, with reference to the drawings wherein:

FIG. 4 illustrates engine maps utilized in the present invention;

FIG. 6A shows intake manifold pressure required to maintain a 17:1 AFR given an amount of fuel;

FIG. 6B shows a naturally aspirated, unthrottled AFR given a desired fuel amount (MFDES);

DETAILED DESCRIPTION

Figure 1:
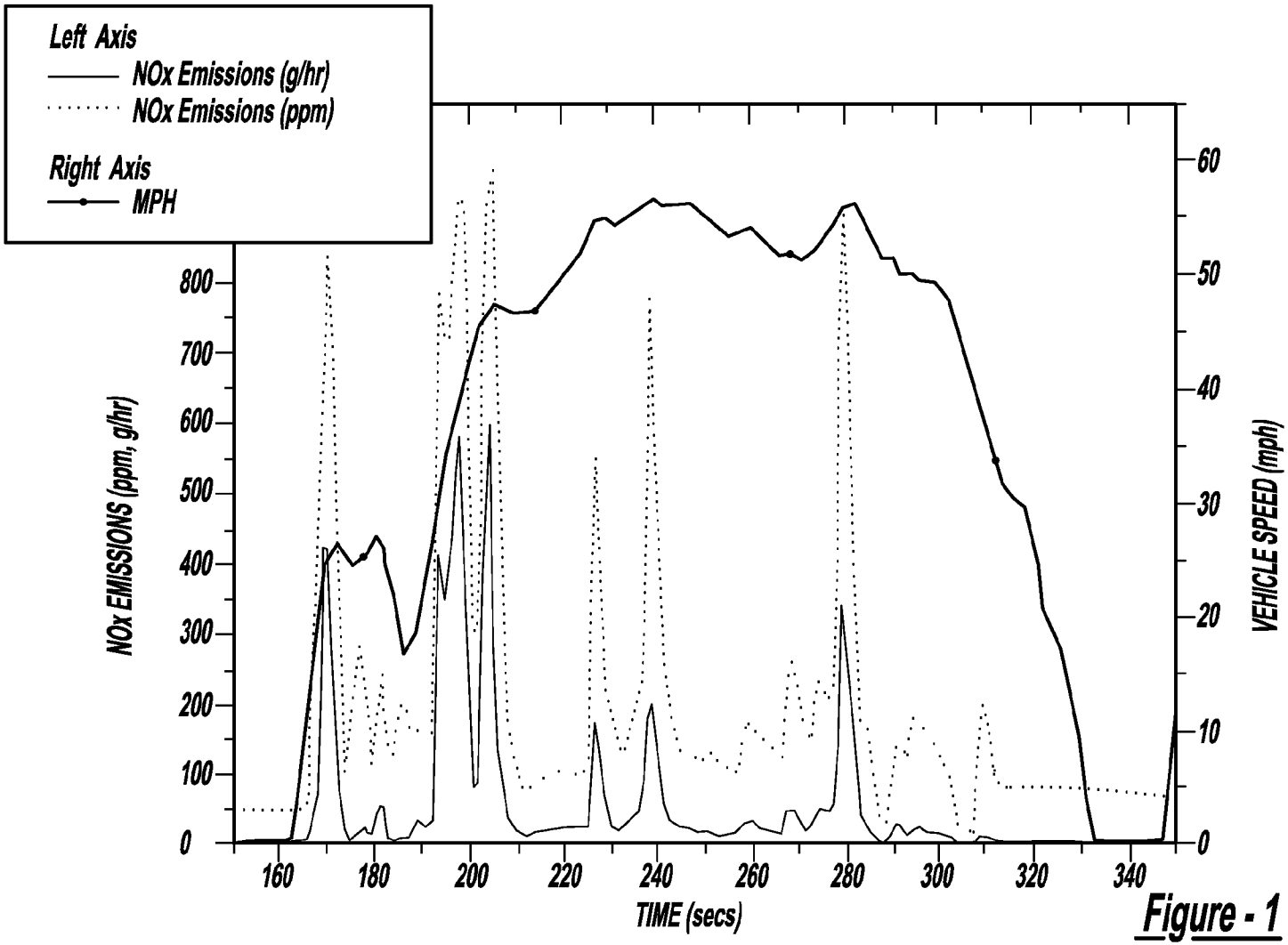
FIG. 1 is a graph showing NOx production of a vehicle during a drive cycle.

FIG. 1 shows NOx emissions during a transient emissions cycle of a vehicle powered by a typical turbocharged diesel engine. The Figure demonstrates that spikes in NOx emissions occur at various times during transient operation. Those spikes typically occur during hard acceleration and the primary reason for their existence is the interaction between the turbocharging system and the typical high pressure EGR system. During hard acceleration, the use of EGR is suspended in order to both divert exhaust flow through the turbine, which allows the turbocharging system to create boost, and increases air flow through the engine. However, without EGR, NOx emissions (concentration) increase dramatically. This comes at a time when the air and thus exhaust mass flow rate are very high causing NOx production to spike dramatically.

During the a typical urban driving cycle, the time in which the engine is operated under conditions that produce these spikes accounts for only about 4-5% of the total cycle time. However, approximately 30-45% of the NOx produced during the cycle comes from these NOx spikes, as illustrated in FIG. 1.

The present invention provides several methods to overcome these NOx spikes.

Figure 2:
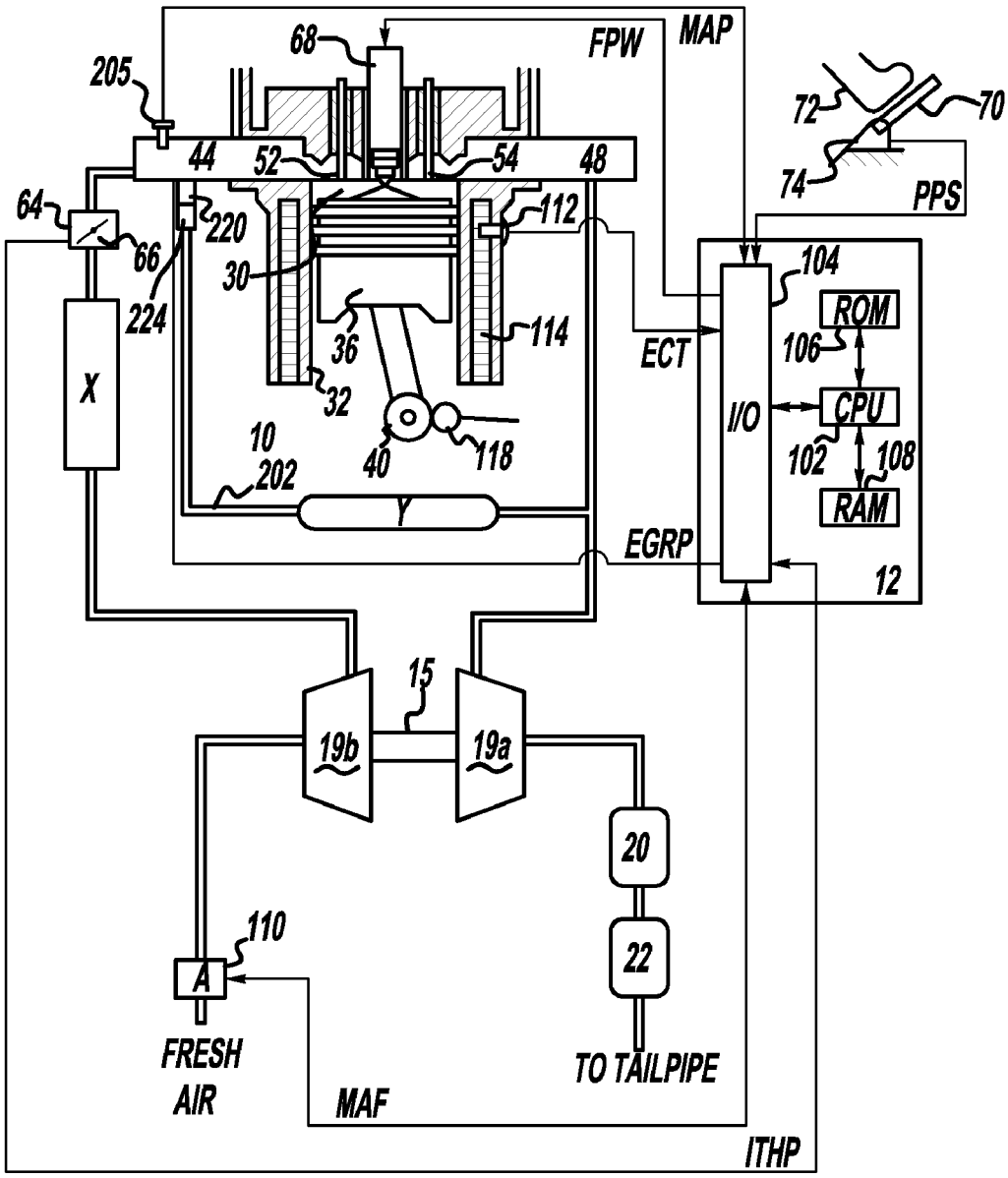
FIG. 2 is a block diagram of an engine in which the invention is used to advantage.

FIG. 2 shows an example of an internal combustions engine system. Specifically, internal combustion engine 10, comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54.

Exhaust air/fuel ratio sensors can also be used in the present invention. For example, either a 2-state EGO sensor or a linear UEGO sensor can be used. Either of these can be placed in the exhaust manifold 48, or downstream of devices 19a, 22, or 20.

Intake manifold 44 communicates with throttle body 64 via throttle plate 66. In one embodiment, an electronically controlled throttle can be used. In this case, the throttle can be used to throttle airflow to help drive in more EGR. In one embodiment, the throttle is electronically controlled to periodically, or continuously, maintain a specified vacuum level in manifold 44. Intake manifold 44 is also shown having fuel injector 68 coupled thereto for delivering fuel in proportion to the pulse width of signal (fpw) from controller 12. This configuration is one potential way to get a premixed mixture for dual-stage combustion, as is known in the art. Fuel is delivered to fuel injector 68 by a conventional fuel system (not shown) including a fuel tank, fuel pump, and fuel rail (not shown). In the case of direct injection engines, as shown in FIG. 2, a high pressure fuel system is used such as a common rail system. However, there are several other fuel systems that could be used as well such as EUI, HEUI, etc. In the embodiment described herein, controller 12 is a conventional microcomputer, including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to the air filter [A on FIG. 2] (note that in a diesel engine the air flow meter is typically read before the compressor, also note that the airflow sensor should be placed before the entrance point for the low pressure EGR loop); engine coolant temperature (ECT) from temperature sensor 112 coupled to cooling jacket 114; a measurement of manifold pressure (MAP) from manifold pressure sensor 205 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N). (Further, controller 12 receives a measurement of manifold temperature (Te) from sensor 76. Alternatively, sensor 76 can provide an indication of exhaust gas temperature, or catalyst temperature.) In an alternative embodiment, the temperature measured is typically into and/or out of catalyst(s) and/or particulate filters, rather than in the exhaust manifold, since there will be substantial temperature drop in the turbine.

Exhaust gas is delivered to intake manifold 44 by EGR tube 202 communicating with exhaust manifold 48. EGR valve assembly 200 is located in EGR tube 202. Stated another way, exhaust gas travels from exhaust manifold 44 first through valve assembly 200, then to intake manifold 44. EGR valve assembly 200 can then be said to be located upstream the intake manifold. There is also optionally an EGR cooler [Y in FIG. 2] placed in EGR tube 202 to cool EGR before entering the intake manifold. Cooling is typically done using engine water, but and air-to-air heat exchanged could also be used.

Pressure sensor 205 provides a measurement of manifold pressure (MAP) to controller 12. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, any type of flow control valve may be used such as, for example, an electrical solenoid powered valve or a stepper motor powered valve.

Also, particulate filter 20 and lean NOx catalyst 22 are shown coupled in the exhaust path downstream of compression device 19. Compression device 19 can be a turbocharger or any other such device. Device 19 has a turbine 19a coupled in the exhaust manifold 48 and a compressor 19b coupled in the intake manifold 44 via an intercooler [X in FIG. 2] which is typically and air-to-air heat exchanger, but could be water cooled. Turbine 19a is typically coupled to compressor 19b via a drive shaft 15. (This could also be a sequential turbocharger arrangement, single VGT, twin VGTs, or any other arrangement of turbochargers that could be used.)Further, drive pedal 70 is shown, along with a driver's foot 72. Pedal position (pp) sensor 74 measures angular position of the driver actuated pedal.

Controls methods for transient NOx reduction are now described with reference to FIGS. 3-5. Generally, this method relates to anticipating the NOx spikes in order to initiate action (e.g., start using dual-stage combustion, start using dual EGR loops, etc.). Further, the method relates to recognizing the end of NOx spikes in order to discontinue this action.

Figure 3:
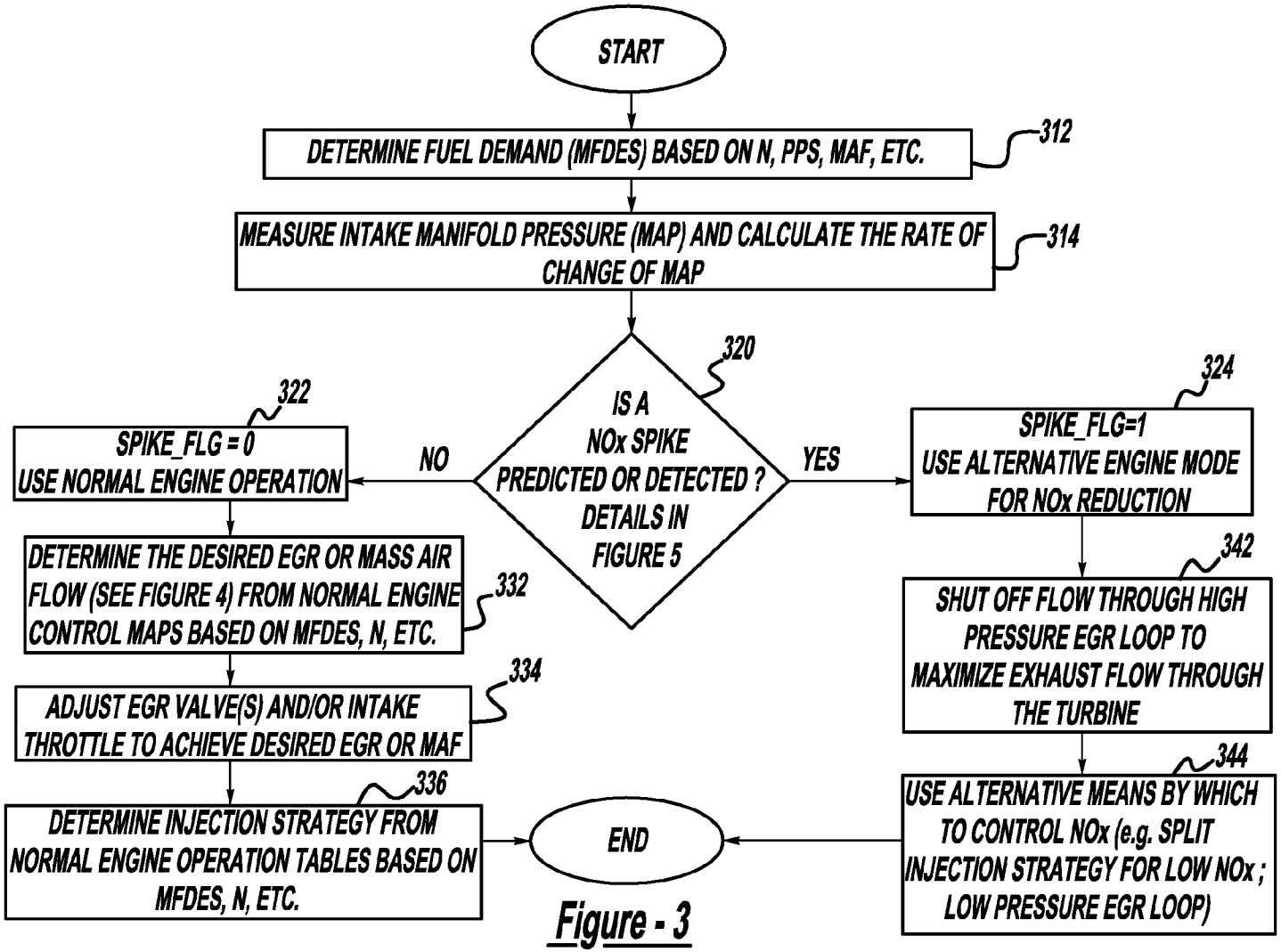
FIGS. 3 and 5 are flowcharts illustrating control methods of the present invention.

Referring now to FIG. 3, a routine is described for controlling engine mode of operation in response to predicted NOx emissions from engine 10. In step 312, the routine determines a required fuel injection amount, or fuel demand (MFDES) based on a pedal position (pp), engine speed (N), and measured mass air flow (MAF). Note that this fuel demand can also be determined based on other parameters. For example, a two dimensional map of engine speed and pedal position can be used. Alternatively, a two-dimensional map of pedal position and vehicle speed can also be used. Moreover, the required fuel is based on a speed error during idle speed control conditions such as below a predetermined vehicle speed with pedal position below a specified value.

Next, in step 314, the routine calculates the manifold pressure (MAP) and the rate of change of manifold pressure (ΔMAP). In this particular embodiment, the change in manifold pressure is approximated as the difference in manifold pressure between the current sample and the previous sample. In one example, manifold pressure is measured from sensor 205. Note that the desired EGR amount and the EGR valve position for the common high pressure loop will depend on the mode of operation chosen from the routine that determines whether a NOx spike is predicted/detected/occurring.

Next, in step 320, the routine determines whether a NOx spike is predicted/determined as described in more detail below with particular reference to FIG. 5. In one particular example the routine checks the flag (spike flg). Note that the spike_flg should be initialized to zero when the engine starts up. Different actions should be taken given the previous value of spike_flg as described herein with regard to FIG. 5. When the answer to step 320 is no, the routine continues to step 322 and uses normal engine operating modes. For example, EGR is delivered using the high pressure EGR loop and the desired fuel (MFDES) is injected as done during steady-state operation.

When the answer to step 320 is yes, the routine continues to step 324 where an alternate mode is performed to reduce NOx generation. The first step to all of the alternative NOx reduction strategies is to shut off the flow of EGR through the conventional high pressure EGR loop in order to quickly increase engine boost by maximizing the exhaust flow through the turbine. In this example, a multiple injection strategy is used to provide the desired fuel demand in such a way that a substantial portion of the fuel burns under fuel lean conditions, thus reducing NOx emissions. Alternatively, other multiple injection strategies could also be used to reduce NOx emissions. In another example, the high pressure EGR loop is shut off to maximize exhaust flow through the turbine and a low pressure EGR loop is used to deliver EGR to the intake air. Thus, according to the present invention, it is possible to reduce engine NOx generation while at the same time allowing engine boosting.

Referring now to FIG. 4, a two-dimensional map is shown where the desired EGR amount (or MAF) is determined based on the fuel demand and engine speed. Optionally, this map can be extended to take into account various engine-operating conditions such as engine coolant temperature and manifold pressure. In this case, multiple maps can be used to generate three-dimensional tables. In the particular example shown in FIG. 4, generally, as the required fuel and engine speed increase, the desired MAF increases (or the desired EGR decreases). Such an approach is typically utilized with turbocharged diesel engines that use high pressure EGR systems because the EGR increases turbo lag and displaces air, thus hampering the engine performance.

However, according to the present invention, if multiple EGR loops are utilized, at least modest levels of EGR can be scheduled even at high fuel demands thereby allowing for decreased NOx emissions, as shown in FIG. 4A.

Figure 5:
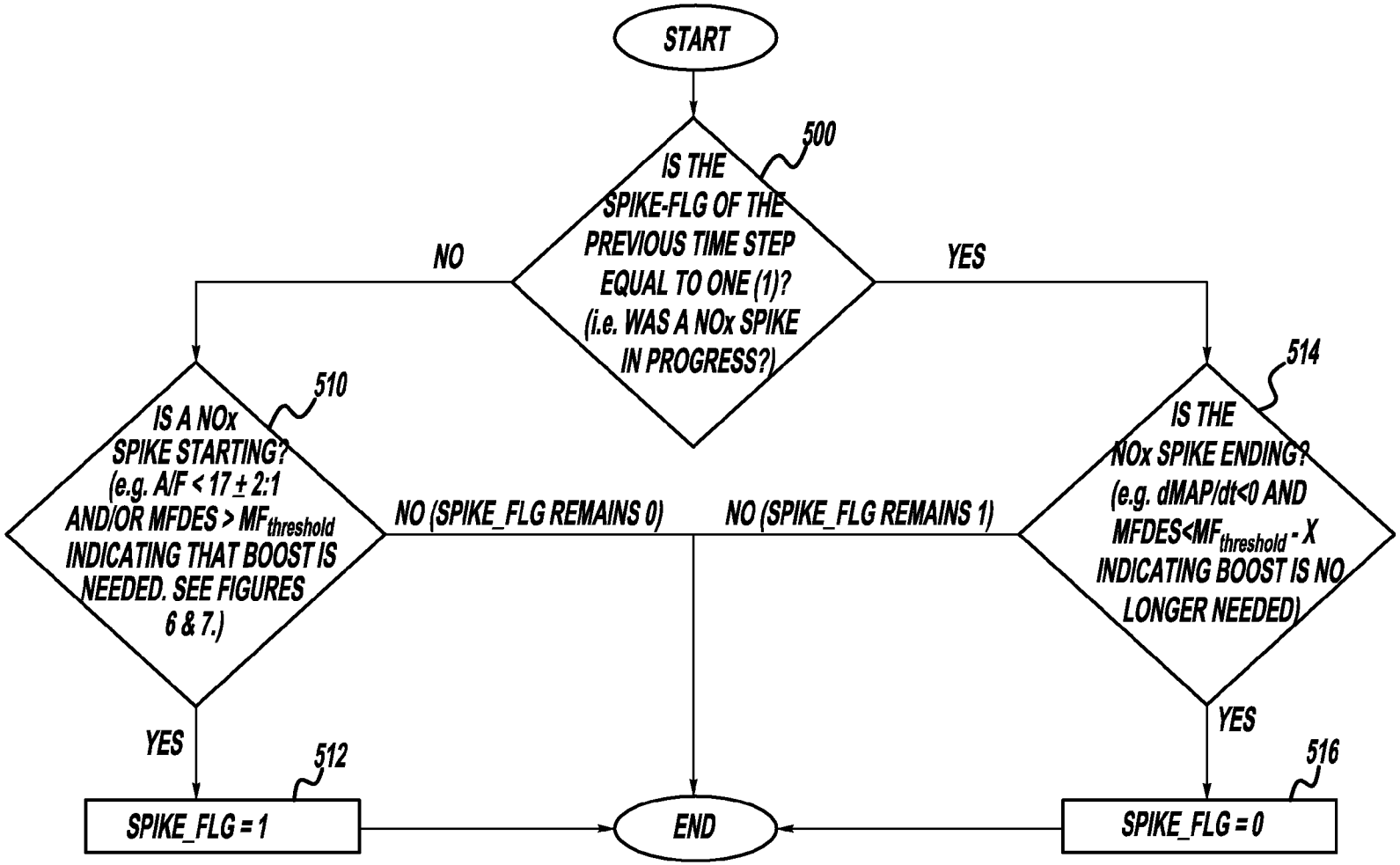

Referring now to FIG. 5, a routine is described for determining when increased NOx emissions, such as NOx spikes, occur. First, in step 500, the routine determines whether a NOx spike was in progress by examining spike_flg.

If spike_flg=0 during step 500, then a NOx spike was not in progress and the routine determines whether a NOx spike starting condition is present. Various parameters can be used to make this determination such as, for example, whether the combustion air/fuel ratio is less than about 17:1, whether the desired fuel amount is greater than a fuel threshold (MF threshold), and/or whether the EGR amount is lower than an EGR threshold. (One could also potentially use concentration of O2, NO, CO2, soot, or other relevant specie in the exhaust, engine torque, pedal position, EGR valve position. However, the preferred method based on the data analyzed is described below with reference to FIGS. 6 & 7. It is only used to determine when the engine can no longer tolerate EGR or when the engine has decided to remove the EGR.) This is described in more detail below with particular reference to FIGS. 6 and 7. When the answer to step 510 is yes, the routine continues to step 512 and sets the spike flag (spike_flg) equal to 1 and the routine ends. If the answer to step 510 is no, the routine is terminated without changing spike_flg from its previous value of zero.

If spike_flg was equal to 1 during step 500, a NOx spike was already in progress and, in step 514, the routine determines whether a NOx ending condition is present. There are various methods for determining whether the NOx spike ending condition is present such as, for example, whether a change in manifold pressure is greater than a threshold, whether this change in pressure is present for a predetermined time, whether desired fuel amount is less than the threshold (including a small margin x), and/or whether engine load is decreasing. As described below, this determination of a NOx spike is used to dynamically select between operating modes in order to reduce tailpipe NOx emissions. Still other conditions that can be used include a rate of change of desired torque, required fuel injection amounts, pedal position, air/fuel ratio (oxygen/fuel ratio), or species such as $O_2$, $CO_2$ in the intake or exhaust. When the answer to step 514 is yes, the routine continues to step 516 to set the spike flag to zero and ends the routine. If the answer to step 514 is no, the spike flag remains at 1 and the routine ends.

Note that the methods described above allow for anticipation of a NOx spike, therefore giving a priori information that can be used to preset engine conditions to avoid the NOx spike generation.

As explained in FIG. 3, a spike_flg equal to 1 signals the engine to eliminate high pressure EGR to maximize exhaust flow through the turbine and operate in an alternate mode that is aimed at reducing NOx. Many of the methods used to reduce NOx emissions do so at the expense of soot and/or fuel economy. Consequently, it is typically not optimal to operate the engine under those conditions when high pressure EGR can be used to reduce NOx instead. In order to optimize utilization of the methods outlined above (and below), a method should be found to anticipate NOx spikes so as to minimize the operation of the engine using these methods. (Various ways to anticipate NOx spikes are suggested above. The preferred method is below.)

Figure 7A:
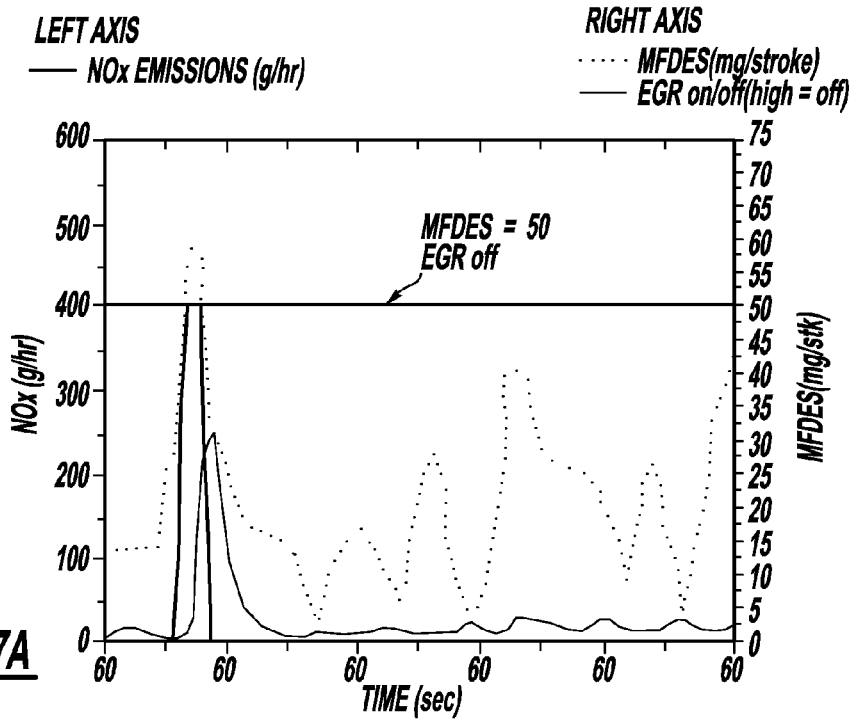
FIGS. 7A-D show detailed engine and vehicle test data that shows how EGR Shuts off once MFDES exceeds 50 mg/stk, and how a negative time derivative of pressure marks the end of a NOx spike.
Figure 7B:
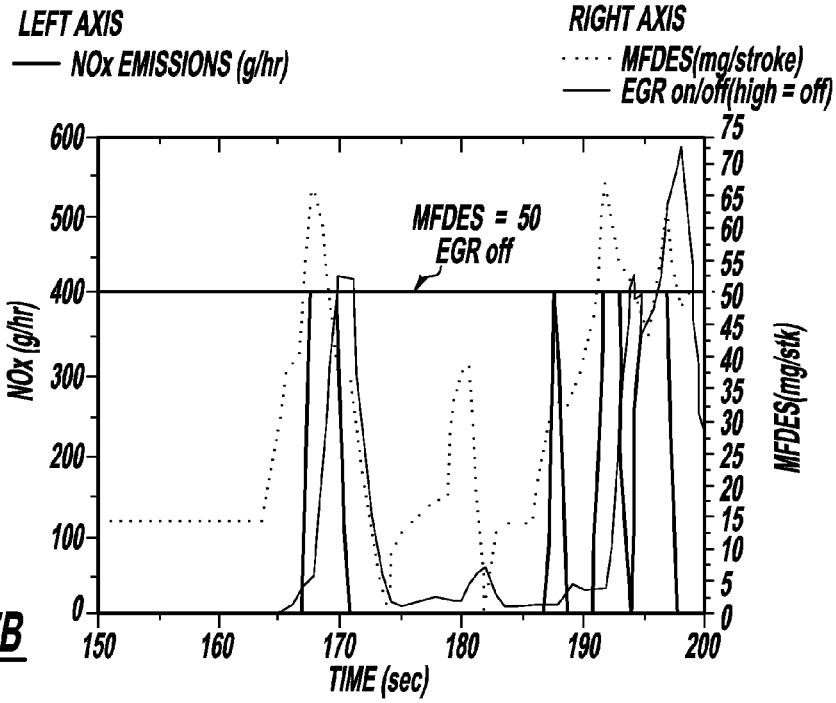

As stated earlier, NOx spikes occur because EGR and boost appear to be mutually exclusive when a typical high pressure EGR loop is used. The main reason for these NOx spikes during aggressive acceleration comes from the engine's need for air, which translates to a need for boost. When high pressure EGR is used, the flow of EGR robs the turbine used to drive the intake compressor of the energy it needs to create that boost. Consequently, high pressure EGR must be shut off during acceleration, which causes NOx emissions to increase dramatically. Thus, the onset of NOx spikes is dictated by the point at which it is decided that the engine can no longer operate without boost. FIG. 6A shows the amount of boost pressure required to maintain a 17:1 air/fuel ratio at various values fuel flow rates (MFDES) when the engine is operated without EGR. MFDES is given in mg/stroke. The fuel flow rate that coincides with atmospheric pressure represents the maximum amount of fuel that can be burned at or above a 17:1, air/fuel ratio without boost. For this case, that value is 50 mg/stroke. To view this in a different way, FIG. 6B shows the air/fuel ratio for a variety of fuel flow rates assuming no boost and no EGR. To reach air/fuel ratios higher than those on the curve, boosting is required. The Figure shows that boosting is needed to attain at least a 17:1 air/fuel ratio when MFDES is 50 mg/stroke. As stated earlier, in order to get boost, the level of EGR is usually significantly reduced or shut off given the current EGR system. FIGS. 7A-7D, and specifically FIGS. 7A-7B, show that the EGR valve does indeed close once MFDES exceeds 50 mg/strk, and that this occurrence coincides with the beginning of a NOx spike for the typical engine operation shown in FIG. 1. This is true over the entire cycle with very few exceptions. The data reveals that the closing of the EGR valve is not necessarily a reliable harbinger to a NOx spike. However, MFDES exceeding a value that creates an AFR lower than 17:1, when the engine is naturally aspirated, appears to be an extremely reliable indication that a NOx spike is imminent.

Note that a 17:1 AFR without boost or EGR was used in this case as the point at which the engine could no longer be operated without boost. This was done because, typically at that point, diesel combustion efficiency drops of due to a lack of available oxygen. However, the choice of air/fuel ratio used to decide this break point involves a tradeoff between engine performance during acceleration and NOx emissions. The quicker high pressure EGR is shut off, the shorter the turbocharger lag is and the quicker the engine accelerates, but at the expense of NOx emissions. The longer the EGR is used, the lower the NOx is, but at the cost of longer turbocharger lag and poorer engine performance. Further analysis shows that the end of a NOx spike is marked by a drop in boost pressure, which is an indication that the load has decreased significantly.

Figure 7C:
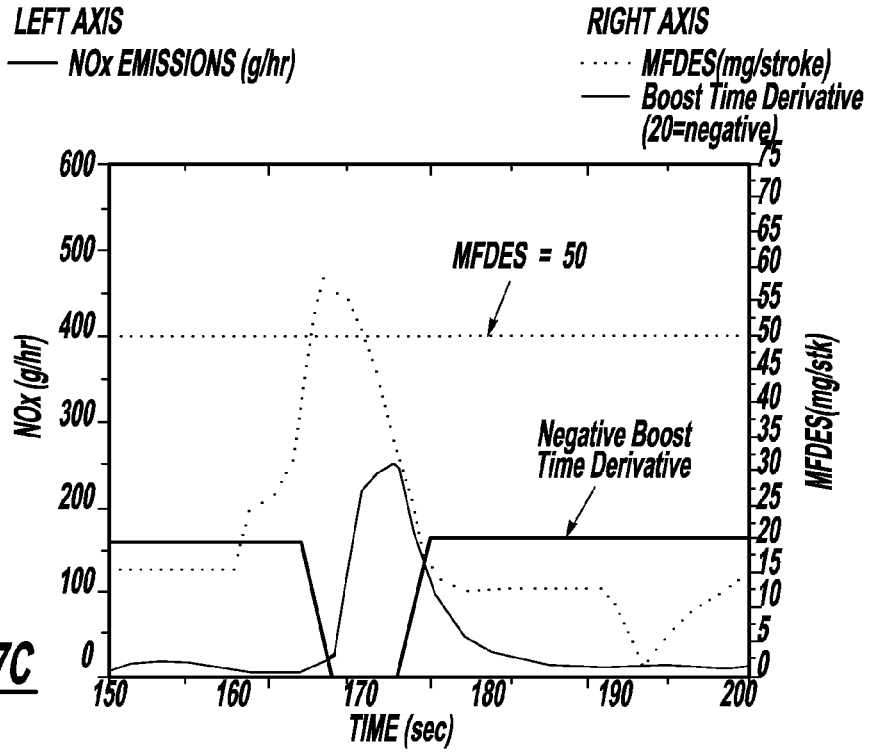
Figure 7D:
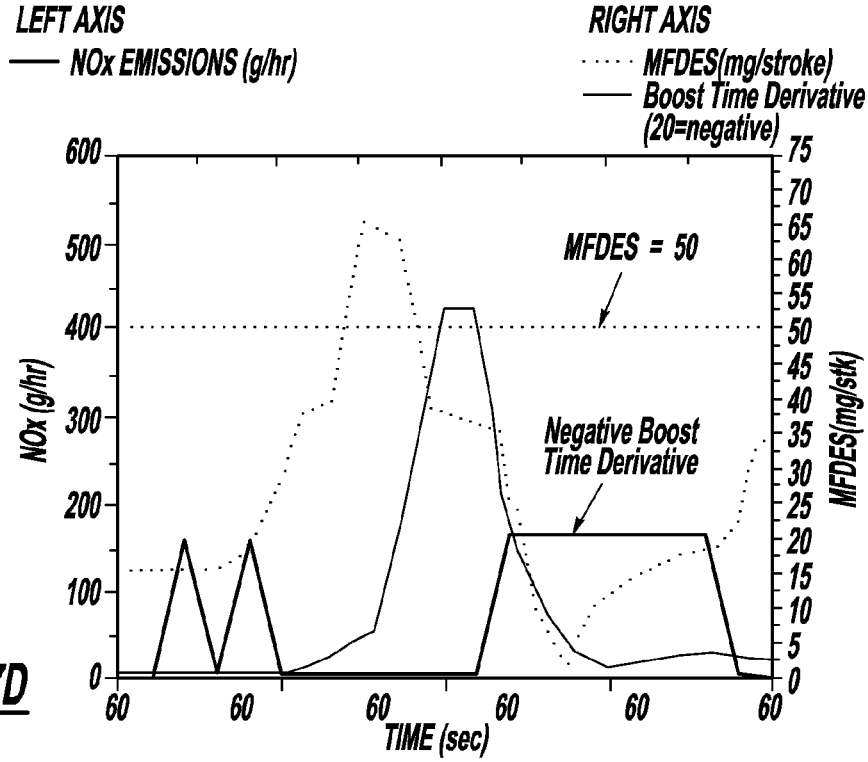

FIGS. 7C-7D show a plot similar to that shown in FIGS. 7A-7B, but with the boost pressure overlayed on the graph. The Figure shows that the end of the NOx spikes occurs 1 or 2 seconds after the time derivative of the boost pressure becomes negative.

One aspect of the present invention is based on using the information described above to predict the start and end of a NOx spike using readily available engine parameters. This information leads to the following criterion for the particular engine selected:

A NOx spike begins when the fuel demand (MFDES) increases above a value at which the air requirement of the engine exceeds what can be achieved without boost (based on a minimum air/fuel ratio of, for example, 17:1). This will signify the point where either additional or alternative steps should be taken to enable simultaneous NOx control and boosting.

When a NOx spike is in progress, the signal that the spike is over should not be sought until the fuel demand drops below a value that is equal to or somewhat less (2-3 mg less) than that used to signify the start of the NOx spike. Using a value somewhat less than that used in the previous step may help prevent choppy engine operation caused by jumping in and out of modes of operation too frequently.

A NOx spike ends when the manifold air pressure (boost) has decreased over the last 1-2 seconds. This signifies a drop in the airflow and engine load.

Note that this data is merely an example of the criteria that can be selected for use in the flow charts and routines described above herein with particular reference to FIGS. 3-5.

Figure 8:
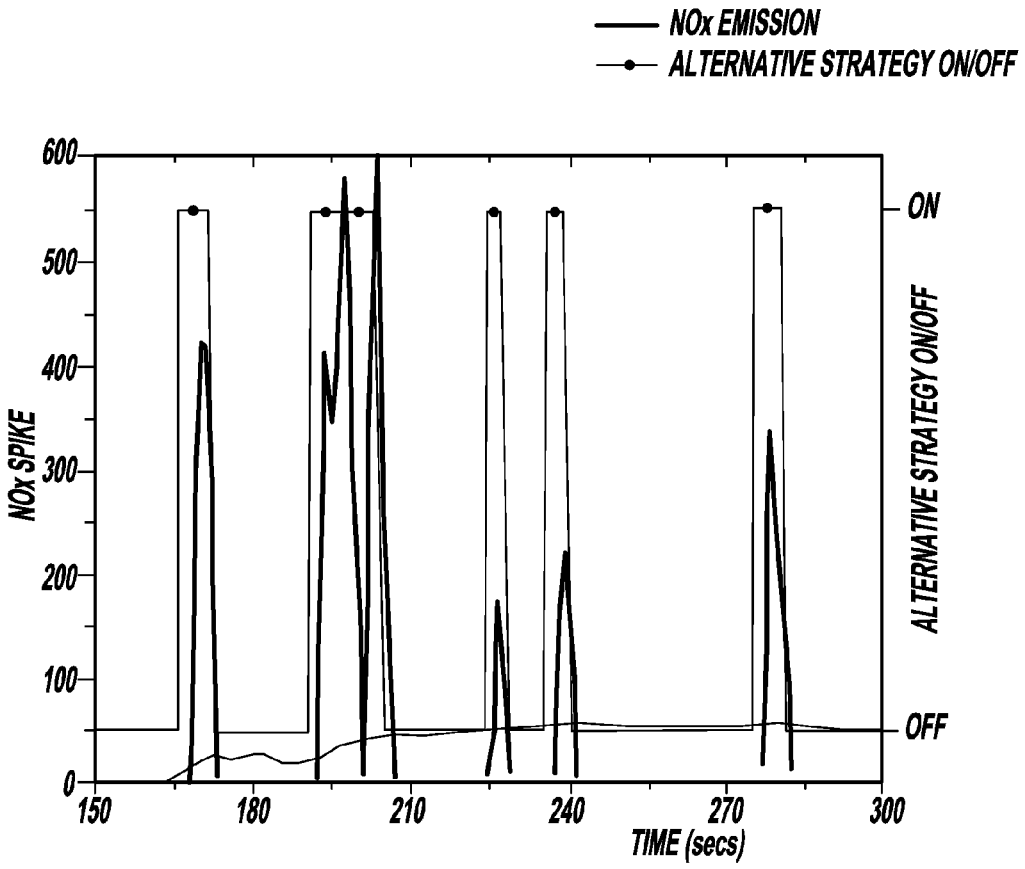
FIG. 8 shows example results utilizing the routines of FIGS. 3-5.

FIG. 8 shows the degree of success that can be achieved in determining the time and duration of NOx spikes using these guidelines. However, as described above, various combinations of parameters can be used, with varying accuracy.

The strategy described herein could facilitate drastic reductions in NOx during transient cycles. The extent of the reduction would depend on the alternative mode of operation used to reduce NOx emissions without the use of high pressure EGR. Some possible alternate modes of operation are:

1. To immediately remove most or all EGR and use dual-stage combustion. Using this method and assuming that a 70% NOx reduction would be obtained during that time (as projected from combustion simulations), it is projected that a 33% reduction in FTP cycle NOx emissions would result. However, it may be possible to achieve even further reduction by combining the dual stage combustion and corresponding control routines with EGR.

2. To remove EGR and use other split injection strategies aimed at reducing NOx emissions. Split main injection has been shown in the SAE literature (see SAE 960633).

3. Continue using EGR at high to moderate levels and use Electric Assisted Boosting to increase intake pressure. No projections of the NOx benefit for this method have been developed. (Note, however, that this approach has a potential drawback in that it will reduce and ultimately eliminate the EGR driving force.)

4. Have both low pressure and high pressure EGR loops on the engine. Close the high pressure EGR loop during NOx spikes and use the low pressure EGR loop to provide a base level of EGR. That level may be smaller than that used during steady state in order to avoid displacing too much air. (Even a small level of EGR would reduce NOx better during acceleration since the high pressure EGR valve would have to be shut anyway.)

Next, a detailed explanation of the dual stage combustion is described. This is a method for diesel combustion in which combustion occurs in two separate stages, lean pre-mixed combustion and normal diesel combustion. Lean pre-mixed combustion is accomplished by introducing a significant portion of the fuel either into the combustion chamber very early in the compression stroke through one or a series of pilot injections or into the intake manifold during induction. The early introduction of this fuel gives it enough time to mix with the air and form a lean (and potentially homogeneous) mixture that ignites due to the increased temperature during compression, potentially in HCCl-like combustion. The remainder of the fuel is injected in any number of injection events to produce standard diesel combustion. This method of combustion obtains low NOx emissions with very little smoke penalty.

Because its formation rates increase with temperature, NOx emissions are primarily produced in an internal combustion engine in combustion regions where the local equivalence ratio is close to stoichiometric. Soot is formed in high temperature rich regions of the combustion chamber. Diesel combustion is a process in which fuel progresses through both of these regions, despite the fact that the overall equivalence ratio is usually fairly lean. Most of the fuel injected in a diesel engine is initially broken down under locally rich equivalence ratios either in the premixed burn stage or in the fuel-rich premixed flame. These regions mainly produce CO, UHC, and soot precursors. That broken down fuel ultimately proceeds through a thin diffusion flame that exists at or near stoichiometric equivalence ratios, where complete products are produced and full heat release is achieved and NOx is produced (see SAE 970873).

The present invention includes a combustion strategy designed to burn significant portion of the fuel under lean conditions, thus avoiding both NOx and soot production.

Figure 9:
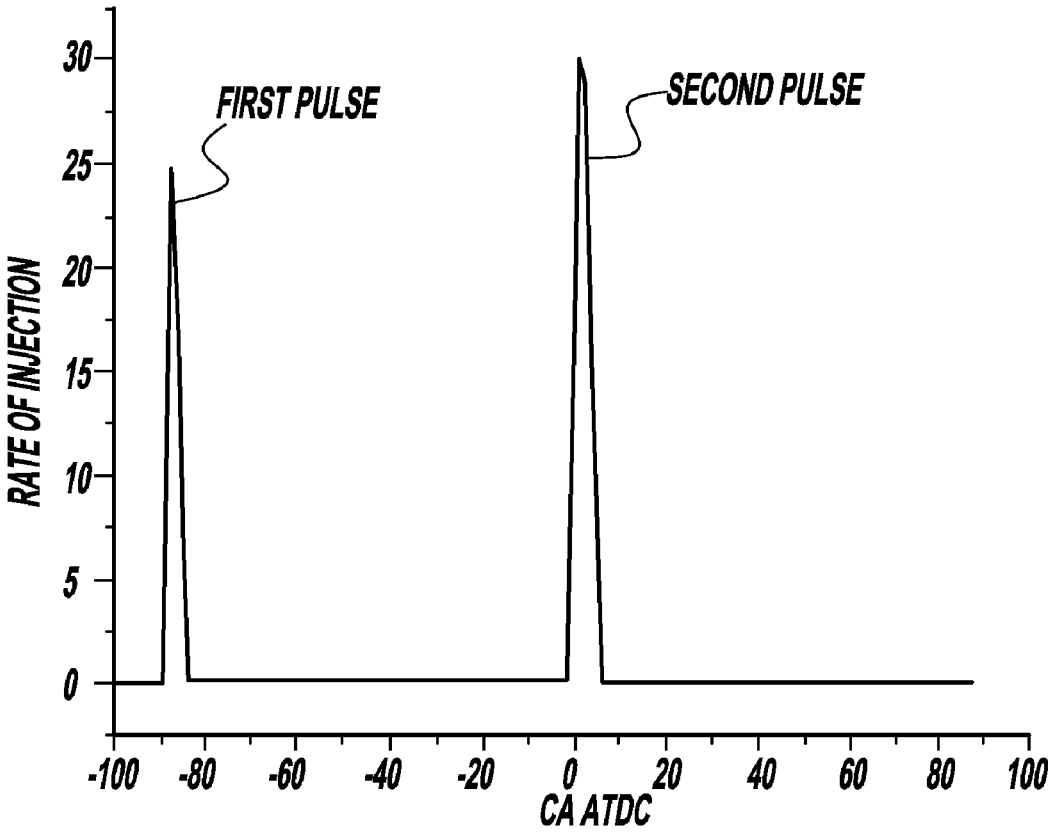
FIG. 9 shows a schematic of one proposed strategy, which involves injecting a significant portion of the fuel into the combustion chamber early during the compression stroke.

FIG. 9 shows a schematic of the proposed strategy, which involves injecting a significant portion of the fuel into the combustion chamber early during the compression stroke (first pulse), thus enabling that fuel to mix with air and burn under lean air/fuel equivalence ratios. The remaining fuel is injected near top dead center (TDC) and burned normally (second pulse). The fuel that is injected during the first pulse is burned under lean conditions and produces an insignificant amount of NOx and soot emissions. The heat release from that fuel serves to heat the contents of the combustion chamber. This shortens the ignition delay of the second pulse, thus reducing both NOx emissions and combustion noise.

This concept was tested using simulations of the closed cycle portion of a diesel engine (IVC to EVO). Simulations were conducted for a single engine operating condition: 1500 rpm, 5 bar BMEP (~30 mg/stroke). Thirteen different injection schemes were assessed. The baseline case was a single injection pulse delivering 100% of the fuel starting at +3.2 CA ATDC. The basic injection parameters defining this baseline case and the other twelve cases are shown in Table 1. [t1]

TABLE 1

Simulation Injection Strategies

| Case Number | 1st Inj. Qty. (% of total) | Dwell SOI (CA) | Main (CA ATDC) | Dwell (CA) |
|---|---|---|---|---|
| 1 | 0 | N/A | +3.2 | N/A |
| 2 | 7 | 10 | +3.2 | 10 |
| 3 | 7 | 20 | +3.2 | 20 |
| 4 | 7 | 40 | +3.2 | 40 |
| 5 | 7 | 90 | +3.2 | 90 |
| 6 | 21 | 10 | +3.2 | 10 |
| 7 | 21 | 20 | +3.2 | 20 |
| 8 | 21 | 40 | +3.2 | 40 |
| 9 | 21 | 90 | +3.2 | 90 |
| 10 | 49 | 10 | +3.2 | 10 |
| 11 | 49 | 20 | +3.2 | 20 |
| 12 | 49 | 40 | +3.2 | 40 |
| 13 | 49 | 90 | +3.2 | 90 |

Figure 10:
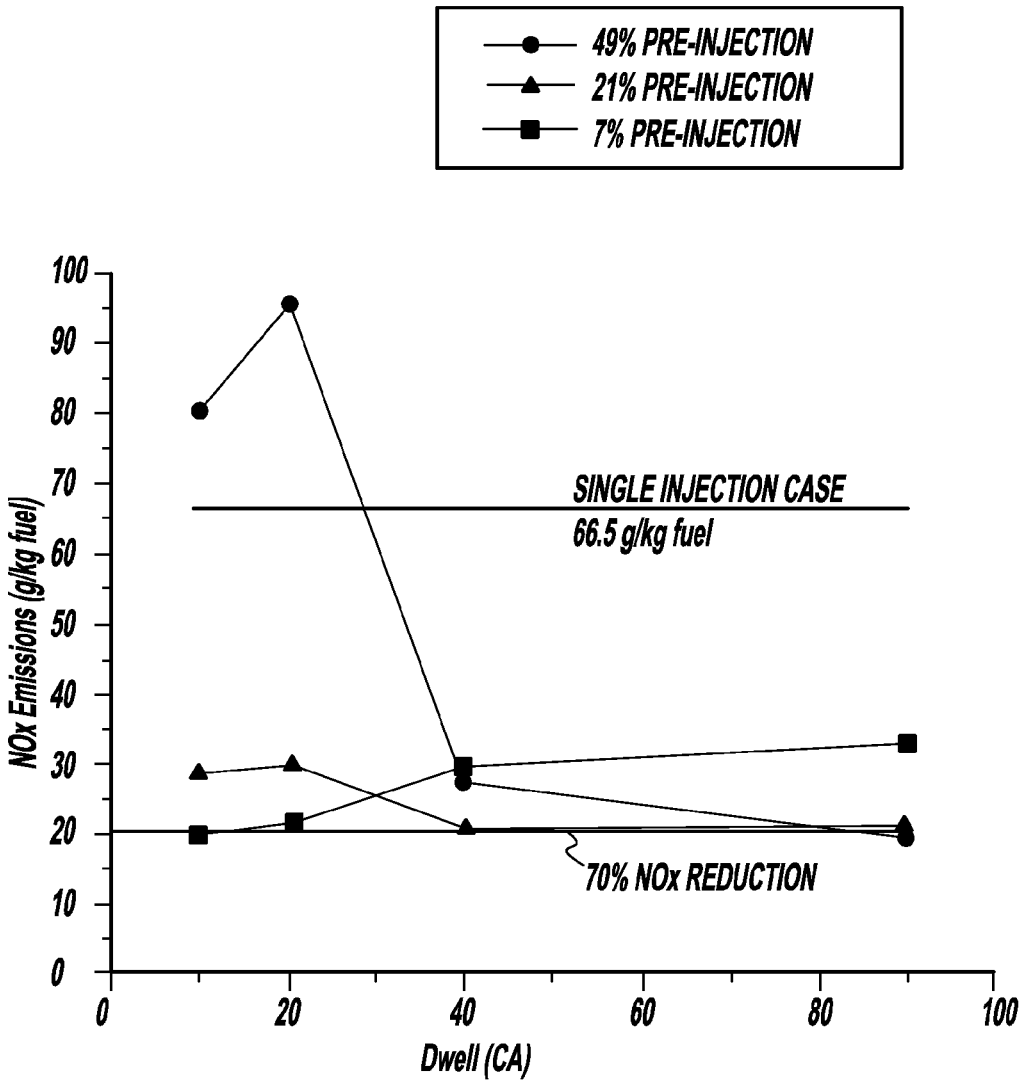
FIG. 10 shows predicted NOx emissions results from a simulation of the proposed strategies in Table 1.

FIG. 10 shows the NOx emissions results (simulated NOx emissions with pre-injection) for this study. The Figure shows that for all cases, except that of relatively close-coupled, large-quantity pilot injection, a substantial NOx reduction (50-70%) was achieved using early fuel injection.

Figure 11:
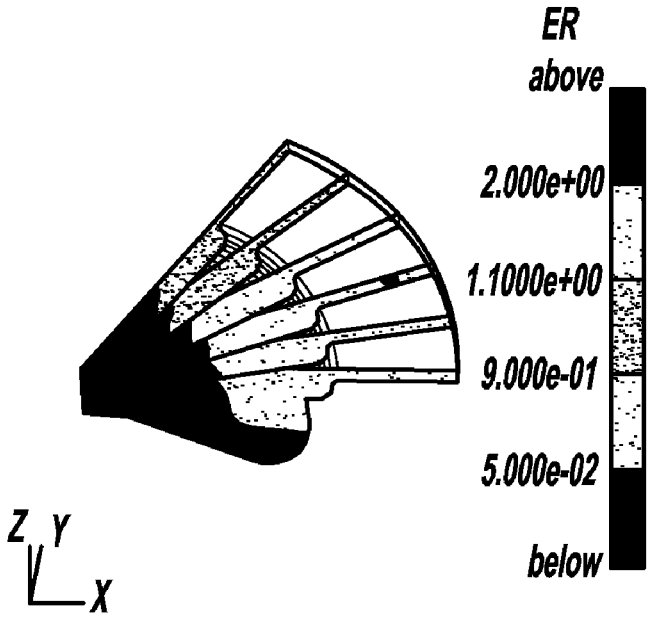
FIGS. 11 and 12 show detailed simulation data of the engine combustion.
Figure 12:
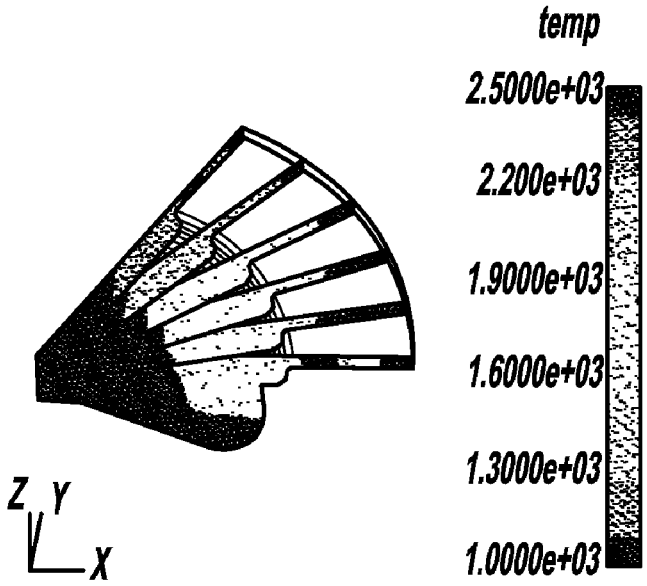

The simulations suggest that two major mechanisms contribute to the decrease in NOx emissions using pre-injection. First, the fuel that is pre-injected has time to mix with air and create a lean mixture before combustion. This can be seen in FIG. 11, which shows a snapshot of the in-cylinder equivalence ratio just prior to main fuel injection in which 21% of the fuel is pre-injected about 90 CA before TDC. This lean mixture burns at very low temperatures (see FIG. 12), thus producing low NOx; it also produces low soot emissions because of the abundance of oxygen. I.e., FIG. 11 shows the lean combustion of pre-injected fuel, and FIG. 12 shows the low temperature combustion of pre-injected fuel.

Figure 13:
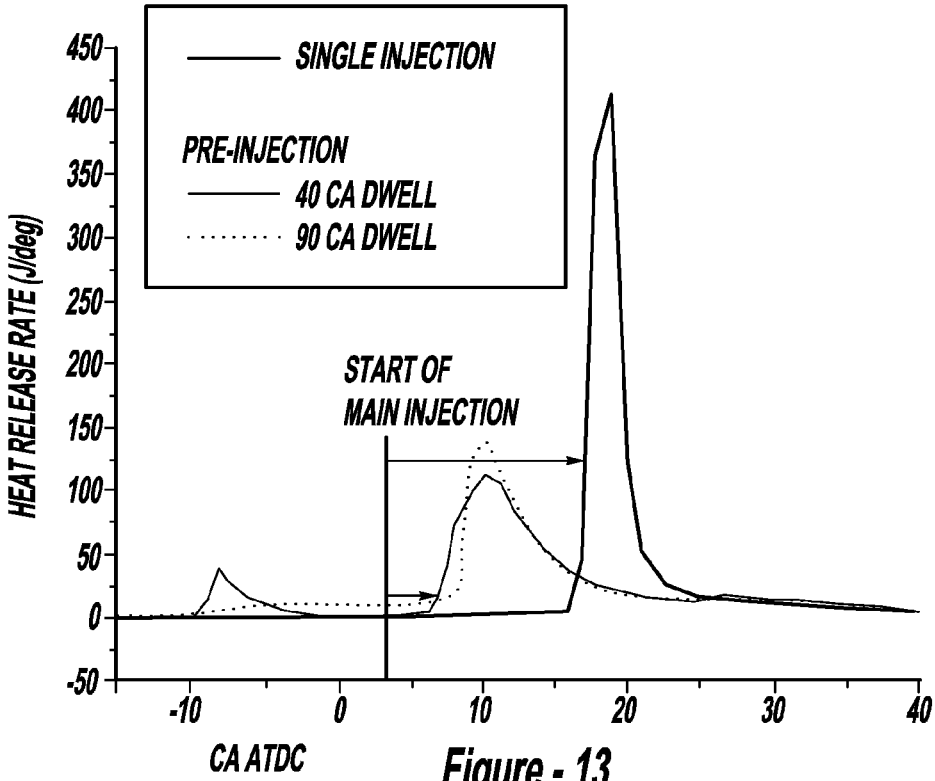
FIG. 13 shows predicted heat release from a simulation of the present invention.

The second factor contributing to NOx reduction is a decrease in the ignition delay caused by the addition of heat in the combustion chamber. The amount of fuel injected during ignition delay has a strong correlation with the amount of NOx produced by the engine. FIG. 13 compares the heat release rate of the baseline (single injection) case with that of two cases in which 21% of the fuel was pre-injected. The Figure illustrates that early fuel injection significantly reduces ignition delay. This results in a significant reduction in NOx emissions. The Figures also illustrates the ignition delay.

Figure 14:
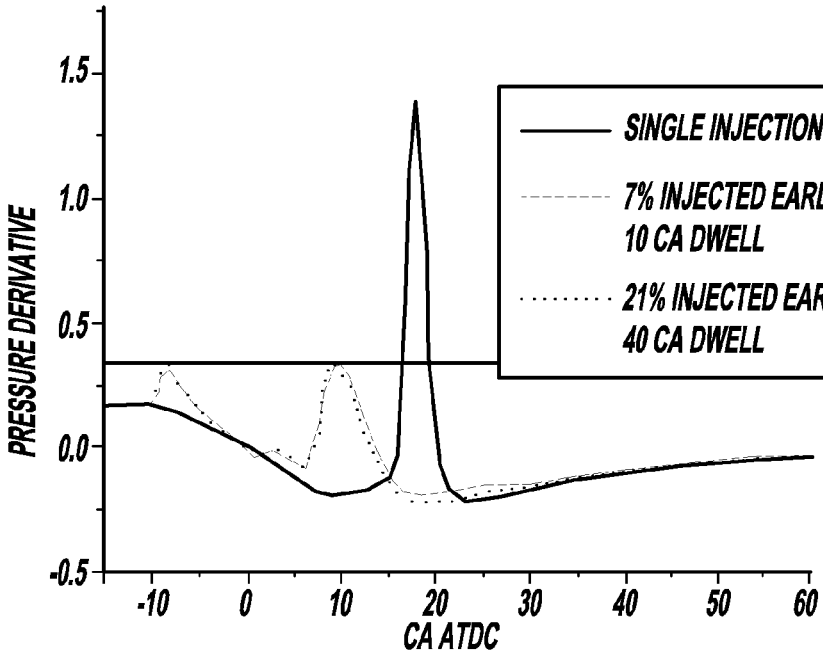
FIG. 14 shows the rate of Pressure Rise for the simulation data.

This method of NOx reduction has an added benefit to noise, much like pilot injection. FIG. 14 compares the rate of change of in-cylinder pressure, a quantity for which the maximum value is directly related to the combustion noise, for three cases:

(1) Single injection.
(2) Close-coupled pre-injection of a small quantity of fuel.
(3) Pre-injection of a moderate quantity of fuel early during compression stroke.

The Figure shows that noise is reduced significantly from a single injection case when part of the fuel is injected early in the compression stroke. The Figure also shows that this noise reduction is comparable to that of what should be representative of a conventional pilot injection.

The following Figures and description relate to various types of EGR systems that can be used to solve the EGR-boost problem described above. Some of these are alternative EGR systems in which all or part of the EGR flows from the exhaust line after a diesel particulate filter (low pressure) to either a point before the compressor (low pressure) or to the intake manifold (high pressure). Since the EGR gases flowing through these lines would still flow through the turbine, this EGR would not diminish the performance of the turbine. Thus, the turbine would be able to spin up quickly even with modest or possibly high levels of EGR. For cases in which only some of the EGR flows through this low pressure loop, a second EGR loop, one that is identical to a conventional EGR loop, is used. In this case, only the low pressure loop is used when trying to accelerate.

Figure 15:
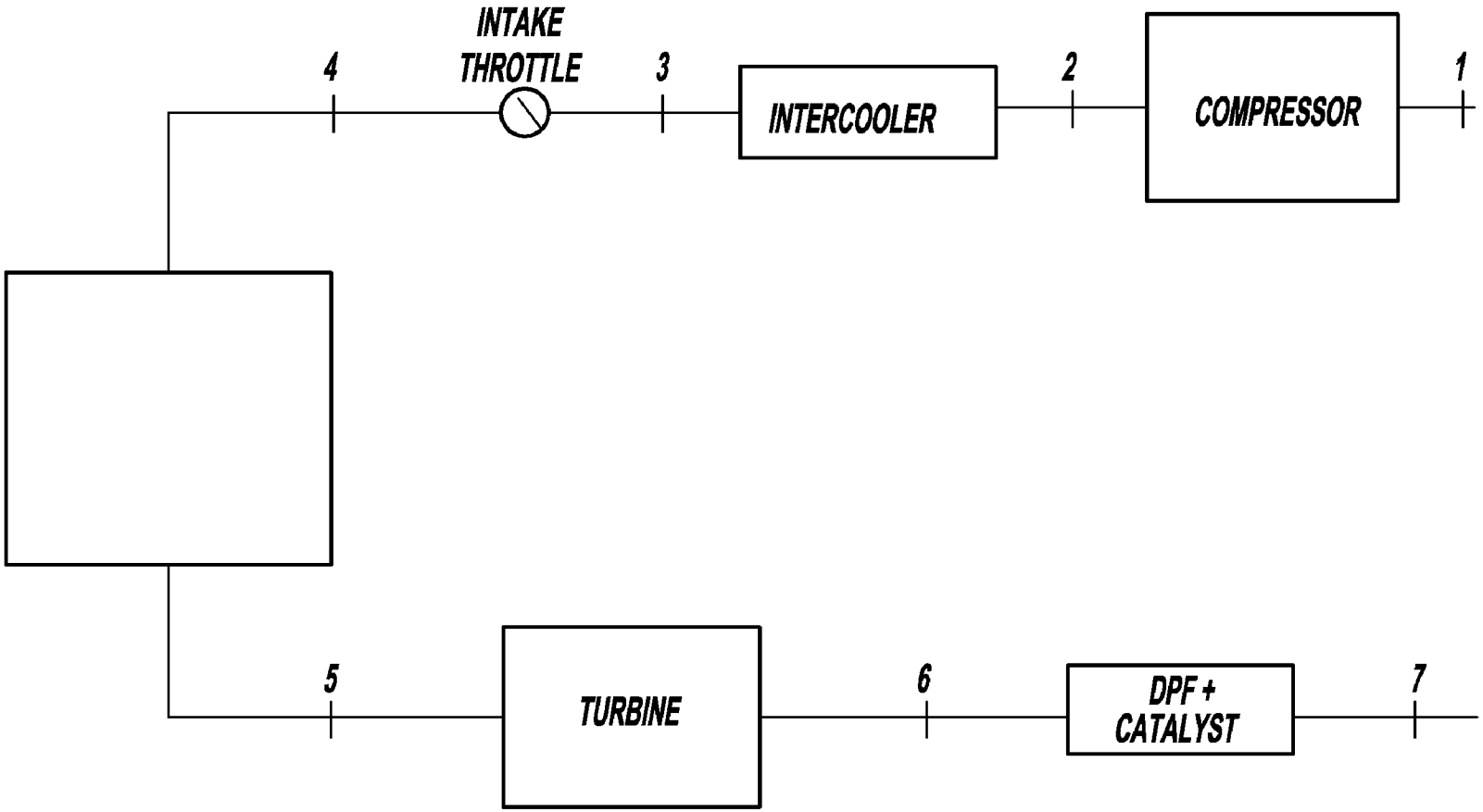
FIG. 15 illustrates various configurations of the present invention.

FIG. 15 shows a schematic view of engine 10, including compressor 19b, turbine 19a, intake manifold 44, exhaust manifold 48, particulate filter 20, lean NOx catalyst 22, and intercooler 1500. For reference, points 1-7 are also labeled to facilitate the description below.

A typical EGR system takes exhaust gas from the exhaust manifold (5) and plumbs it back into the intake manifold (4). Such a system is shown in FIG. 2. For some cases, the flow rate of EGR is too high for the EGR plumbing capacity at natural pressure differences, thus requiring the use of an intake throttle to depress the inlet air pressure and drive more EGR. EGR that flows through this loop does not flow through the turbine, thus starving the turbine for input energy. The following shows the benefits and consequences of using several alternate EGR systems. These systems were narrowed from a host of possibilities according to the following criteria:

One should not pump dirty or sooty exhaust gas.

One should not put dirty or sooty exhaust gas into the compressor.

Possible EGR Systems given the above criteria:

1. 5 to 4—Common High Pressure Loop (see FIGS. 2)
2. 7 to 4—Low Pressure to High Pressure (see FIG. 16a)
3. 7 to 1—Low Pressure Loop (see FIG. 16b)
4. 5 to 4 & 7 to 4—dual-loop EGR system (see FIG. 16c)
5. 5 to 4 & 7 to 1—dual-loop EGR system (see FIG. 16d)
6. 7 to 2—Low Pressure to High Pressure using intercooler for cooling EGR (see FIG. 16e)
7. 5 to 4 & 7 to 2—dual-loop EGR system using intercooler for cooling EGR (see FIG. 16f)Note that some of the equipment in the EGR loops described herein is optional such as coolers, throttles, and pumps.

EGR System #1: 5 to 4 (see FIG. 2)

As stated, this is the basic EGR system, described in FIG. 2, which is suitable for use with the present invention, especially if the multiple injection strategy described above is utilized. This system allows EGR flow without pumping (especially at light loads), and a low filling/purging volume (quick response). However, it also potentially has a bulk flow pumping loss for throttling, dirty EGR (durability), less flow through the turbine-turbo lag, no EGR during transients—NOx control problem, and coordinated control with EGR valve and intake throttle.

Figure 16A:
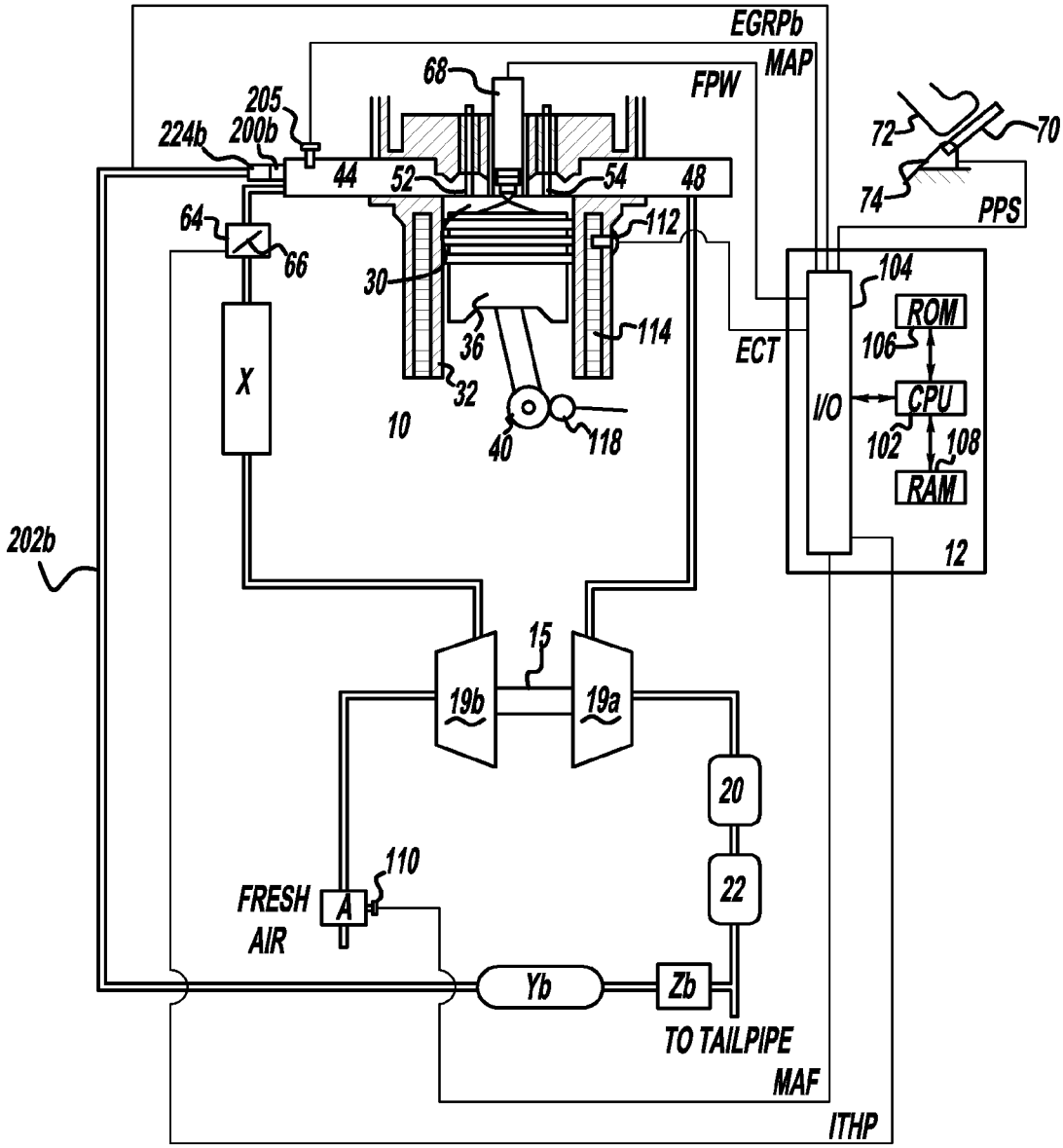
FIGS. 16a-16f show alternative embodiments of the present invention with respect to the block diagram of FIG. 2.

EGR System #2: 7 to 4 (see FIG. 16a)

In this system, EGR is brought from a point after the diesel particulate filter to the intake manifold using an air pump (not shown). An additional cooler (not shown) is placed somewhere in the EGR loop in order to cool the EGR before entering the combustion chamber. The flow rate of EGR is controlled using a valve. Such a system is also shown in FIG. 16a. In particular, exhaust is routed from manifold 48 to the turbine 19a. From there, it passes to particulate filter 20 and lean NOx catalyst 22. Exhaust gas downstream of device 22 is then routed to pump Zb, and cooler Yb, before passing through the valve 200b and entering manifold 44.

This system provides minimal dirty EGR (better durability), minimal bulk flow pumping losses (intake throttle can be eliminated if desired), all exhaust gas flows through the turbine (improved turbo response), low filling/purging volume (quick response), EGR can be used during transients—NOx control, and a simpler control system (if not using ITH to control EGR). However, all of the EGR is pumped (high pressure, high mass flow), all exhaust flows through DPF—increased back pressure, and there is a longer EGR plumbing loop.

Figure 16B:
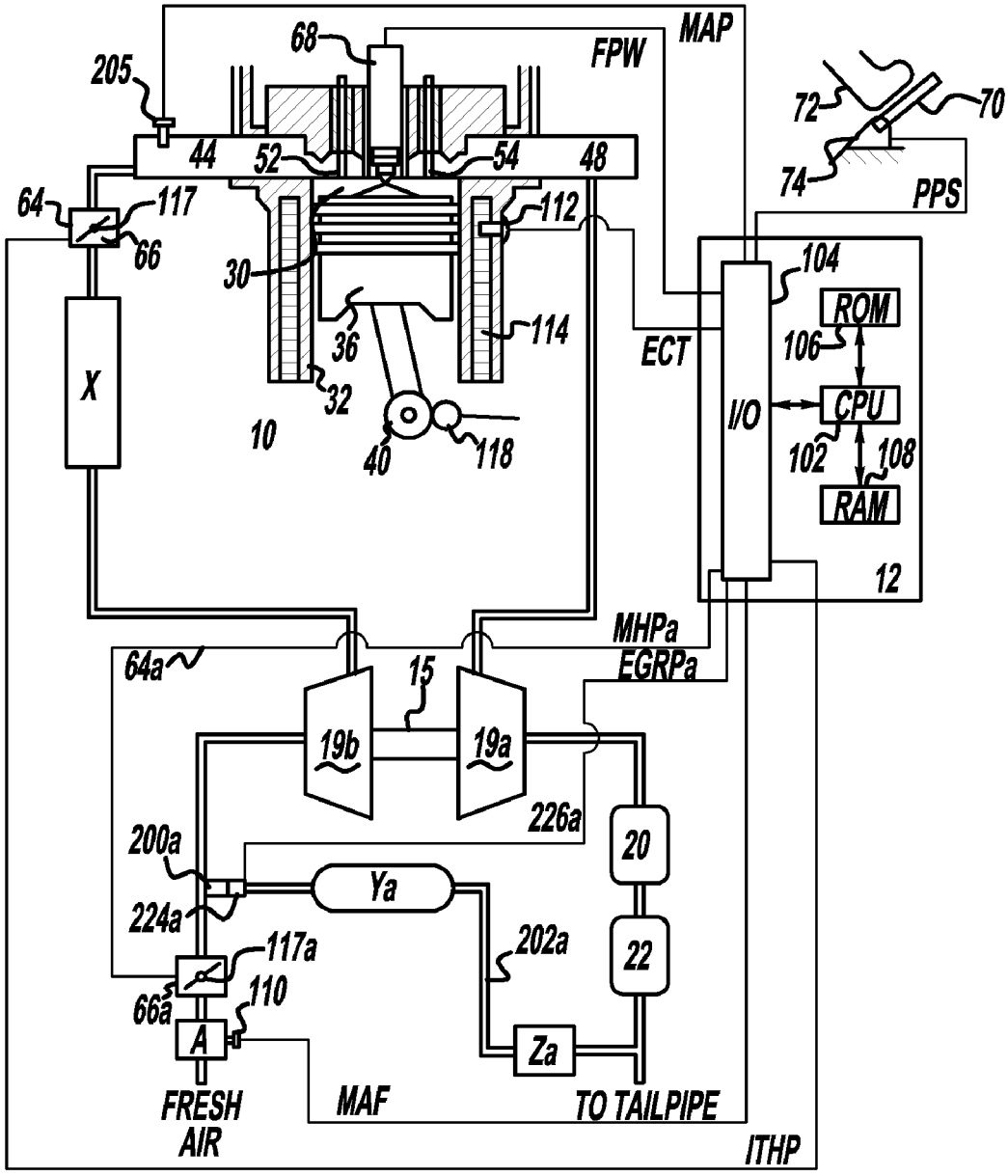

EGR System #3: 7 to 1 (see FIG. 16b)

In this system, EGR is brought from a point after the diesel particulate filter to a point before the compressor using an air pump or a venturi (not shown). A cooler (Ya) is also placed in the EGR loop in order to cool the EGR before entering the compressor. The flow rate of EGR is controlled using a valve such as valve 200. An optional pump Za is also shown. An optional intake throttle 117 is also shown.

Such a system gives minimal dirty EGR (better durability), minimal bulk flow pumping losses—(intake throttle can be eliminated), all exhaust gas flows through the turbine (improved turbo response), potential to use a venturi to pump EGR, EGR during transient NOx control, and a potentially simpler control system (if throttle eliminated). Further, there is potential for better EGR distribution/mixing. However, there may be a need for a pump, all exhaust flows through DPF increased back pressure, there is a longer EGR plumbing loop, and there is an increased filling/purging volume—degraded transient response.

Figure 16C:
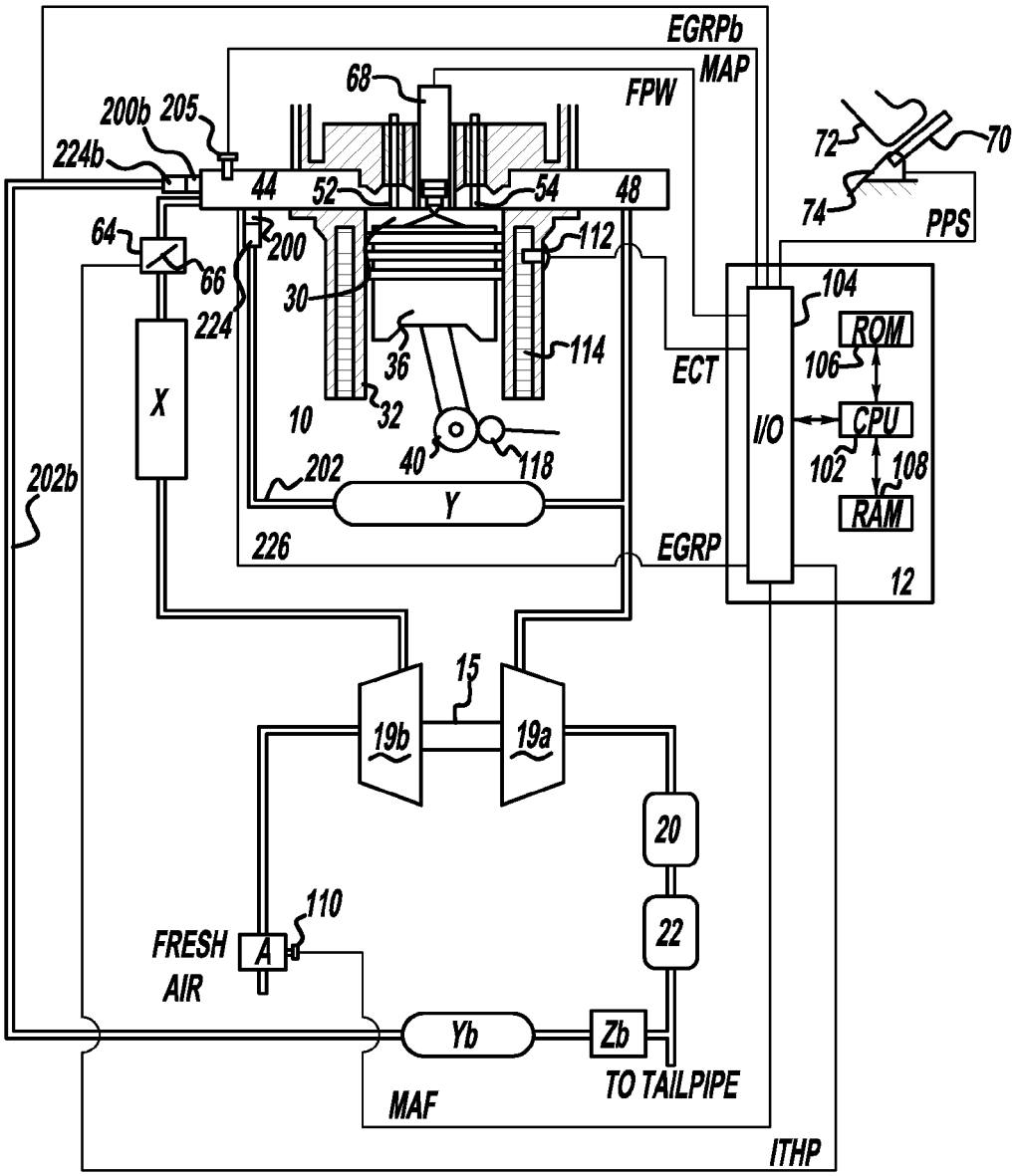

EGR System #4: 5 to 4 & 7 to 4 (see FIG. 16c)

In this system, shown in FIG. 2, two EGR loops are used. One EGR loop connects the exhaust manifold to the intake manifold. The other takes exhaust gases from a point after the DPF and pumps the into the intake manifold using an air pump. When the vehicle is not accelerating, the first EGR loop is used to its fullest extent, and the second loop is used to supplement the EGR flow to avoid using the intake throttle. When the vehicle is trying to accelerate (or when a NOx spike is predicted), the first EGR valve is shut to maximize the exhaust flow through the turbine, thus improving transient response of the engine. The second loop is used to supply a base amount of EGR to control NOx emissions. Coolers (not shown) and pumps (not shown) can be present in both EGR loops to reduce EGR temperature.

This system allows partially free EGR, minimal bulk flow pumping losses (potential to eliminate intake throttle), EGR during transient—NOx control, more exhaust flow through turbine during normal operation—less turbo lag, all exhaust flows through the turbine during transient—better response, and low filling/purging volume (quick response). However, there may be durability issues. Further, this system may require pumping EGR (high pressure, low mass flow), added cost, longer EGR plumbing, coordinated control between the loops, and slightly higher flow through DPF (increased back pressure).

Figure 16D:
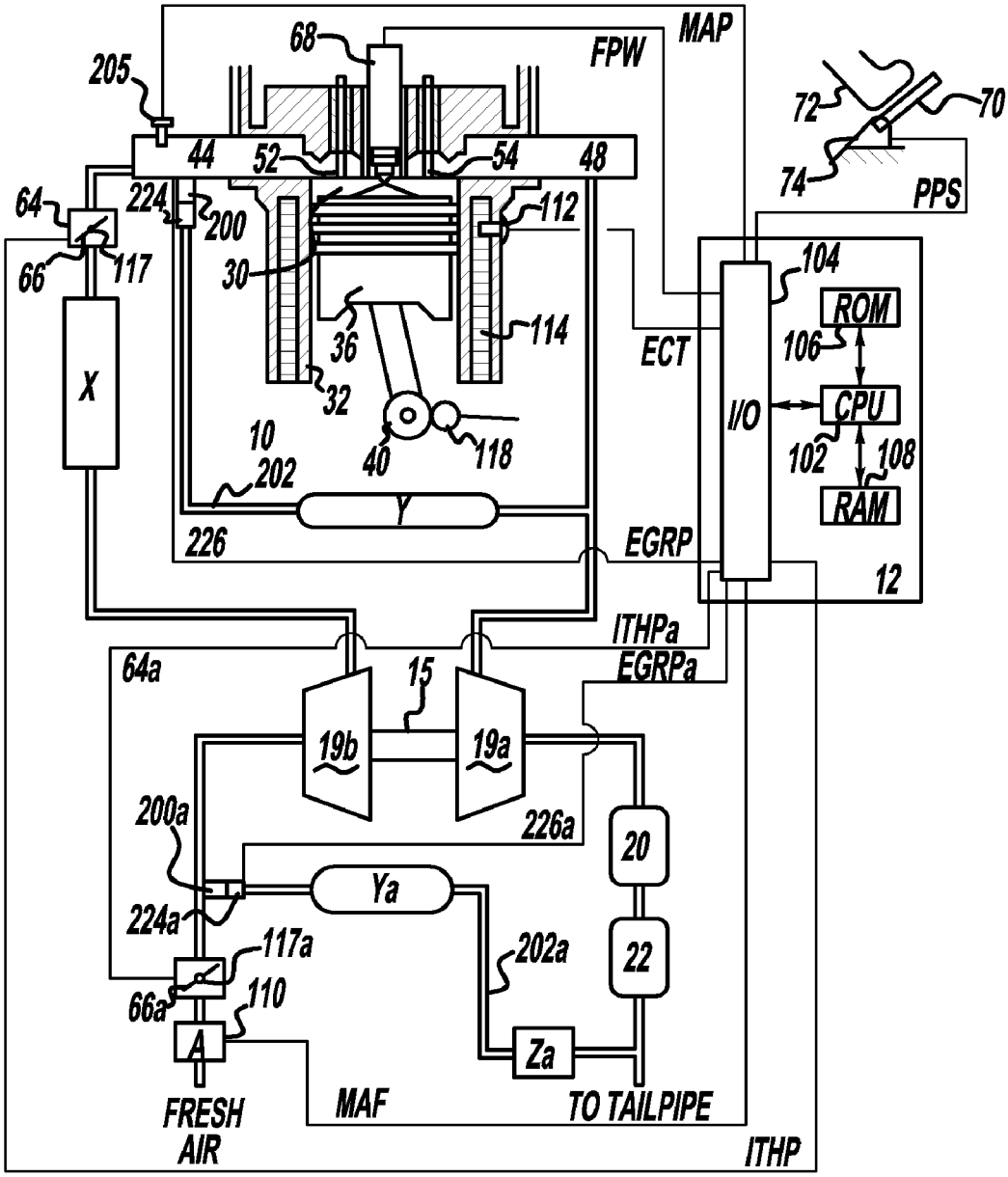

EGR System #5: 5 to 4 & 7 to 1 (see FIG. 16d)

This system includes two EGR loops. One EGR loop connects the exhaust manifold to the intake manifold, like those used currently. The other takes exhaust gases from a point after the DPF and pumps it to a point before the compressor using either an air pump or a venturi. When the vehicle is not accelerating (no NOx spike predicted), the first EGR loop is used as much as is needed, and the second loop is used to supplement the EGR flow if required, thus avoiding the use of the intake throttle. When the vehicle is trying to accelerate (or a NOx spike is predicted), the first EGR valve is shut to maximize the exhaust flow through the turbine, thus improving transient response of the engine. The second loop is used to supply a base amount of EGR to the engine to control NOx emissions. Optional Coolers (Y) cab be present in both EGR loops to reduce EGR temperature. Further, optional pumps (Z) could also be used.

This system allows partially free EGR, minimal bulk flow pumping losses (possibility to eliminate intake throttle), EGR during transient—NOx control, more exhaust flows through turbine during normal operation—less turbo lag, all exhaust flows through the turbine during transient—better response, low filling/purging volume for most EGR flow (quick response), some of EGR, most during transient operation, will be well mixed, and likely to use a venturi instead of an air pump (low pressure, low mass flow). However, in additional to durability, there may be added cost due to the dual loops, longer EGR plumbing, coordinated control, and slightly higher flow through DPF (increased back pressure).

The inventors here have conducted tests both on an engine dynamometer and in a vehicle and have found a benefit to using this loop to NOx (~10-12% reduction) without sacrificing engine performance or fuel economy. In fact, there may even be a fuel economy benefit to using this system over the convention system, system #1), depending on the engine and system configuration.

Figure 16E:
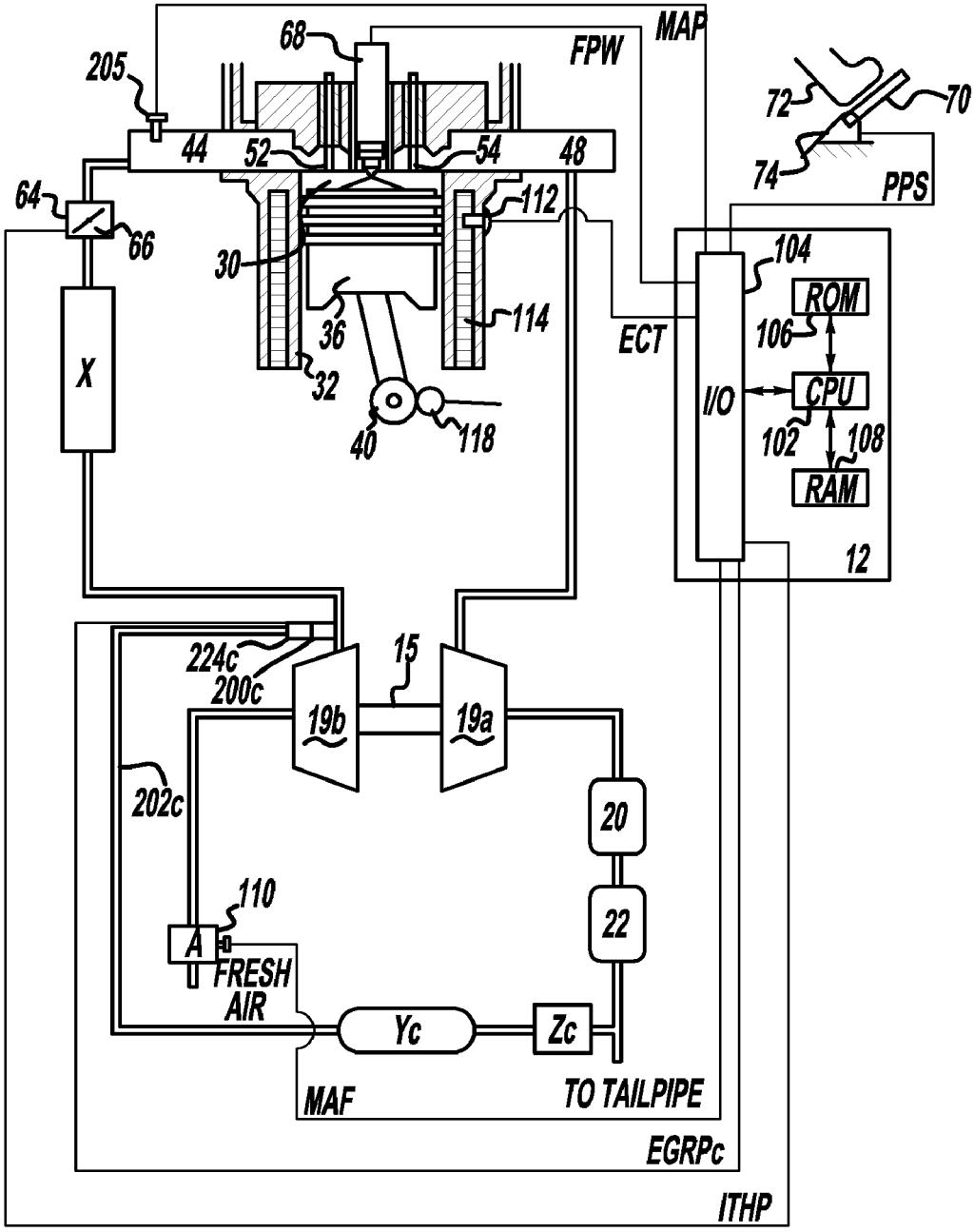

EGR System #6: 7 to 2 (see FIG. 16e)

This system has essentially the same benefits and disadvantages as EGR system #3, with only two exceptions. First, the pressure just after the compressor is slightly higher than in the intake manifold, therefore flowing EGR in this loop would be more difficult. Second, using the intercooler to cool the EGR with the intake air would introduce a potential cost save since it would eliminate the need for an EGR cooler. An optional pump Zc, optional intercooler Yc, are shown routing exhaust gas via line 202c upstream of the device 19b. A vacuum regulator 224c is also shown providing an EGR pressure signal (EGRPc), along with an EGR valve 200c. Note that System #6 can be considered as a possible variation of the low to high pressure EGR loop configuration of system #2.

Figure 16F:
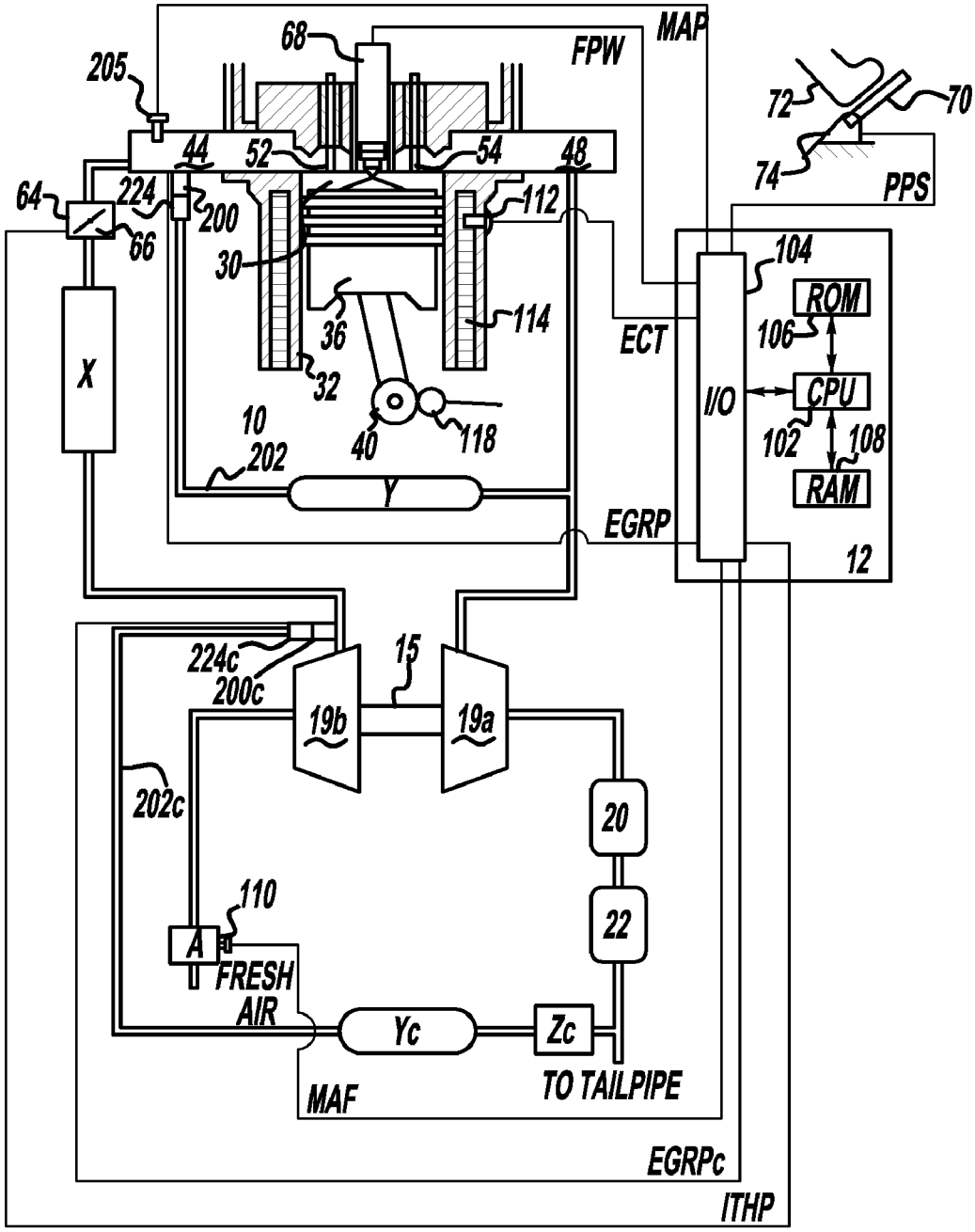

(CR System #7: 5 to 4 & 7 to 2 (see FIG. 16f)

This system has essentially the same benefits and disadvantages as EGR system #5, with only two exceptions. First, the pressure just after the compressor is slightly higher than in the intake manifold, therefore flowing EGR in this loop would be more difficult. Second, using the intercooler to cool the EGR with the intake air would introduce a potential cost save since it would eliminate the need for an EGR cooler. Note that System #7 can be considered as a possible variation of system #4.

Finally, note that systems 4, 5, and 7 are especially suited for use with the strategy described above herein. Thus, according to the present invention, it is possible to use a dual loop EGR system to reduce NOx. In one example, the two EGR loops are each adjusted via valves to control the amount of EGR based on engine operating conditions. In some conditions, both EGR loops are used, and in other conditions, only one of the loops it utilized. Further still, in other example, neither loop is used.

In one specific example described above, at least two operating modes are utilized. A first mode is used where two EGR loops are utilized (both a high pressure loop and a low pressure loop). In this case, the lop pressure loop is used to put in a low level of EGR while the high pressure loops is used to control EGR amount in total (or airflow). A second mode uses only the low pressure EGR loop to maximize the mass flow through the turbine.

In this way, it is possible to minimize NOx emissions, even during tip-in NOx spikes.

This concludes the detailed description. As noted above herein, there are various alterations that can be made to the present invention.

We claim:

1. A system for an engine having an intake *manifold coupled to an intake conduit* and *an* exhaust manifold *coupled to an exhaust conduit, the system comprising*:

[, the engine having] a compression device coupled [with a first portion] *to the engine, and comprising a compressor* coupled [to] *into* to the intake *conduit* and a [second portion] *turbine* coupled [to the exhaust manifold of the engine, the system comprising:] *into the exhaust conduit and configured to drive the compressor;*

*a combustion chamber communicating with the intake manifold and with the exhaust manifold;*

*a soot filter coupled into the exhaust conduit downstream of the turbine;*

*a fuel injector configured to inject a first pulse of fuel into the combustion chamber during a compression stroke and a second pulse of fuel during an expansion stroke, the compression stroke and the expansion stroke occurring during a first operating condition and in one engine cycle;* a first [exhaust gas] *exhaust-gas* recirculation system having a first end coupled to the exhaust manifold upstream of the [second portion of the compression device] *turbine* and a second end coupled to the intake manifold downstream of the [first portion compression device] *compressor*, [said first] *the first exhaust-gas recirculation* system also having a first valve [that], *which* adjusts a first flow amount from the exhaust manifold to the intake manifold; and a second [exhaust gas] *exhaust-gas* recirculation system having a first end coupled downstream of the [second portion of the compression device] *turbine and the soot filter* and a second end coupled to the intake manifold, [said first] *the second exhaust-gas recirculation* system also having a second valve [that], *which* adjusts a second flow amount from the exhaust *conduit* to the intake manifold.

2. The system recited in claim 1 further comprising a controller electrically coupled to [said] *the* first and second [valve] *valves*.

[3. The system recited in claim 2 wherein said controller determines engine operating conditions, and actuates both said first and second valve during a first mode, and only said second valve during a second mode based on said determined operating conditions.]

4. The system recited in claim [3] *1*, wherein the engine is a diesel engine[, and wherein said second end of said second exhaust gas recirculation system is coupled to the intake manifold downstream of the first portion of the compression device].

5. A system for an internal combustion engine *having an intake manifold coupled to an intake conduit and an exhaust manifold coupled to an exhaust conduit, the system* comprising:

a first [exhaust gas] *exhaust-gas* recirculation path for introducing a first amount of burnt exhaust gas into [an] *the* intake manifold [of the engine];

a first valve [located in said] *coupled into the* first *exhaust-gas recirculation* path;

a second [exhaust gas] *exhaust-gas* recirculation path for introducing a second amount of burnt exhaust gas into [an] *the* intake manifold [of the engine];

a second valve [located in said] *coupled into the* second *exhaust-gas recirculation* path;

a compression device powered by exhaust flow [that], *which* raises manifold pressure*, the compression device comprising a compressor coupled into the intake conduit and a turbine coupled into the exhaust conduit and configured to drive the compressor*;

*a soot filter coupled into the exhaust conduit downstream of the turbine;*

*a fuel injector capable of delivering multiple injections per engine cycle to a combustion chamber;* and a controller [for] *operatively coupled to the fuel injector and configured to:*

[determining] *determine* an [engine load] *engine-load* condition associated with decreased NOx emissions, and [controlling] *control* both [said] *the* first and second [valve] *valves* to be open during [said] *the* decreased NOx *emissions;*

*estimate an interval where increased nitrogen-oxide emissions are predicted, a start of said interval responsive to fuel demand, an end of said interval responsive to manifold air pressure (MAP); and*

*during said interval, enact one or more of: injecting a first pulse of fuel into the combustion chamber during a compression stroke and a second pulse of fuel dur-*

*ing an expansion stroke, the compression stroke and the expansion stroke occurring in one engine cycle; and drawing some exhaust through the second exhaust-gas recirculation path.*

6. The system of claim 5, wherein [said] *the* controller [further controls] *is further configured to open* only one of [said] *the* first and second [valve] *valves* [to be open] during [increased NOx conditions] *said interval.*

7. A system for a diesel engine, comprising:

[a turbine coupled to an exhaust side of the engine;]

a compressor coupled [to] *into* an *intake manifold on an* intake side of the engine;

*a turbine coupled into an exhaust conduit on an exhaust side of the engine and configured to drive the compressor;*

*a soot filter coupled into the exhaust conduit downstream of the turbine;* a first [exhaust gas] *exhaust-gas* recirculation path from the exhaust [side of the engine] *conduit* to [the] *an* intake [side of the engine] *manifold*, the first [exhaust gas] *exhaust-gas* recirculation path having an exhaust portion and an intake portion, the exhaust portion coupled to the exhaust [side of the engine] *conduit* upstream of the turbine and the intake portion coupled to the intake [side of the engine] *manifold* downstream of the compressor; and a second [exhaust gas] *exhaust-gas* recirculation path from the exhaust [side of the engine] *conduit* to the intake [side of the engine] *conduit*, the second [exhaust gas] *exhaust-gas* recirculation path having an exhaust portion and an intake portion, the exhaust portion coupled to the exhaust [side of the engine] *conduit* downstream of the turbine *and the soot filter* and the intake portion coupled to the intake [side of the engine] *manifold;*

*a fuel injector capable of delivering multiple injections per engine cycle to a combustion chamber of the engine; and*

*a controller operatively coupled to the fuel injector and configured to:*

*during a first operating mode, inject a first pulse of fuel into the combustion chamber during a compression stroke and a second pulse of fuel during an expansion stroke, the compression stroke and the expansion stroke occurring in one engine cycle; and*

*during a second operating mode, draw some exhaust through the second exhaust-gas recirculation path.*

8. The system recited in claim 7 wherein said first exhaust gas recirculation path includes a first control valve coupled between the exhaust portion and the intake portion of the first exhaust gas recirculation path.

9. The system recited in claim 7 wherein said second exhaust gas recirculation path includes a second control valve coupled between the exhaust portion and the intake portion of the second exhaust gas recirculation path.

10. The system recited in claim 7 further comprising a catalyst coupled to the exhaust side of the engine downstream of the turbine.

[11. The system recited in claim 7 further comprising a particulate filter coupled to the exhaust side of the engine downstream of the turbine.]

12. The system [recited in] *of* claim 7 wherein [said] *the* intake portion of the second [exhaust gas] *exhaust-gas* recirculation path is coupled to [said intake side of the engine] *the intake conduit* upstream of the compressor.

13. The system [recited in] *of* claim 7 wherein [said] *the* intake portion of the second [exhaust gas] *exhaust-gas* recirculation path is coupled to [said intake side of the engine] *the intake manifold,* downstream of the compressor.

14. The system recited in claim 13 further comprising a throttle on the intake side of the engine.

[15. A system for a diesel engine, comprising:

a turbine coupled to an exhaust side of the engine;

a compressor coupled to an intake side of the engine;

a first exhaust gas recirculation path from the exhaust side of the engine to the intake side of the engine, the first exhaust gas recirculation path having an exhaust portion and an intake portion, the exhaust portion coupled to the exhaust side of the engine upstream of the turbine and the intake portion coupled to the intake side of the engine downstream of the compressor; and a second exhaust gas recirculation path from the exhaust side of the engine to the intake side of the engine, the second exhaust gas recirculation path having an exhaust portion and an intake portion, the exhaust portion coupled to the exhaust side of the engine downstream of the turbine and the intake portion coupled to the intake side of the engine downstream of the compressor.]

[16. The system recited in claim 15 wherein said first exhaust gas recirculation path includes a first control valve coupled between the exhaust portion and the intake portion of the first exhaust gas recirculation path.]

[17. The system recited in claim 15 wherein said second exhaust gas recirculation path includes a second control valve coupled between the exhaust portion and the intake portion of the second exhaust gas recirculation path.]

[18. The system recited in claim 15 further comprising a catalyst coupled to the exhaust side of the engine downstream of the turbine.]

[19. The system recited in claim 15 further comprising a particulate filter coupled to the exhaust side of the engine downstream of the turbine.]

[20. The system recited in claim 15 further comprising an intercooler coupled to the intake side of the engine downstream of the compressor.]

[21. The system recited in claim 20 further comprising a throttle coupled to the intake side of the engine downstream of the compressor and downstream of the intercooler.]

*22. The system of claim 1, wherein the second pulse of fuel is injected before +20 crank-angle degrees after top-dead-center (CA ATDC) of the engine cycle.*

*23. The system of claim 22, wherein the first pulse of fuel begins at or before −10 crank-angle degrees after top-dead-center (CA ATDC) of the engine cycle.*

*24. The system of claim 23, wherein the first pulse of fuel begins between −90 and −10 crank-angle degrees after top-dead-center (CA ATDC) of the engine cycle.*

*25. The system of claim 1, wherein the first pulse of fuel comprises between 5 and 25 percent of the fuel injected into the combustion chamber during the engine cycle.*

*26. The system of claim 1, further comprising a heat exchanger coupled into the second exhaust-gas recirculation system and configured to cool exhaust gas therein.*

*27. The system of claim 1, further comprising a heat exchanger coupled into the first exhaust-gas recirculation system and configured to cool exhaust gas therein via a coolant liquid.*

*28. The system of claim 1, further comprising a lean nitrogen-oxide catalyst coupled into the exhaust conduit downstream of the turbine.*

*29. The system of claim 1, wherein the first operating condition is predictive of increased nitrogen-oxide release from the combustion chamber, and wherein the fuel injector is further configured to inject fuel during a second operating condition predictive of less nitrogen-oxide release from the combustion chamber relative to the first operating condition.*

*30. The system of claim 29, wherein the increased nitrogen-oxide release comprises a spike in nitrogen-oxide release.*

*31. The system of claim 29, wherein the first valve is configured to close during the first operating condition, thereby restricting a flow of exhaust gas through the first exhaust-gas recirculation system.*

*32. The system of claim 29, wherein the second valve is configured to stay at least partly open during the first and second operating conditions, thereby admitting exhaust gas through the second exhaust-gas recirculation system.*

*33. The system of claim 1 wherein the second end of the second exhaust-gas recirculation system is coupled to the intake manifold upstream of the compressor.*

*34. The system of claim 5, wherein the controller is further configured to close the first valve during said interval.*

*35. The system of claim 7, wherein the controller is further configured to restrict exhaust flow through the first exhaust-gas recirculation path during the first or second operating modes.*

*36. The system of claim 7, wherein during the first operating mode, the first pulse of fuel is injected beginning at or before −10 crank-angle degrees after top-dead-center (CA ATDC) of the engine cycle, and the second pulse of fuel is injected before +20 crank-angle degrees after top-dead-center (CA ATDC) of the engine cycle.*

*37. The system of claim 7, wherein the first and second operating modes overlap.*

*38. The system of claim 7, wherein the first and second operating modes are entered upon in response to first and second conditions, respectively, the first and second conditions predictive of increased nitrogen-oxide release from the combustion chamber.*

*39. The system of claim 38, wherein the increased nitrogen-oxide release comprises a spike in nitrogen-oxide release.*

*40. The system of claim 38, further comprising injecting fuel into the combustion chamber during a third operating mode, wherein the third operating mode is entered upon in response to a third condition, the third condition predictive of reduced nitrogen-oxide release from the combustion chamber relative to the first and second conditions.*

*41. The system of claim 40, wherein the first or second condition comprises a fuel-injection demand exceeding a threshold value, and wherein the third condition comprises the fuel-injection demand being less than the threshold value.*

*42. The system of claim 40, wherein the first or second condition comprises one or more of an air-to-fuel ratio and an exhaust-gas recirculation flow rate falling below a threshold value, and wherein the third condition comprises the one or more of the air-to-fuel ratio and the exhaust-gas recirculation flow rate being above the threshold value.*

*43. The system of claim 40, wherein the first or second condition comprises one or more of a manifold air pressure exceeding a threshold rate of change and an engine load decreasing, and wherein the third condition comprises one or more of the manifold air pressure not exceeding the threshold rate of change and the engine load failing to decrease.*

*44. The system of claim 7, wherein the first pulse of fuel forms a homogeneous lean mixture, and the second pulse of fuel forms a stratified mixture.*

* * * * *